(12) United States Patent
Saito et al.

(10) Patent No.: US 8,519,049 B2
(45) Date of Patent: Aug. 27, 2013

(54) CURABLE COMPOSITION

(75) Inventors: Atsushi Saito, Shinagawa-ku (JP); Masaki Ito, Shinagawa-ku (JP); Shingo Kano, Shinagawa-ku (JP); Hisashi Maekawahara, Shinagawa-ku (JP); Naomi Okamura, Shinagawa-ku (JP)

(73) Assignee: Cemedine Co., Ltd., Tokyo (JP)

( * ) Notice: Subject to any disclaimer, the term of this patent is extended or adjusted under 35 U.S.C. 154(b) by 0 days.

(21) Appl. No.: 13/543,969

(22) Filed: Jul. 9, 2012

(65) Prior Publication Data

US 2012/0316253 A1    Dec. 13, 2012

Related U.S. Application Data

(62) Division of application No. 11/992,404, filed as application No. PCT/JP2005/017709 on Sep. 27, 2005, now abandoned.

(51) Int. Cl.
*C08L 83/00*    (2006.01)
*C08L 83/04*    (2006.01)

(52) U.S. Cl.
USPC ............ 524/588; 521/59; 521/134; 523/179

(58) Field of Classification Search
USPC ................... 521/59, 134; 523/179; 524/588
See application file for complete search history.

(56) References Cited

U.S. PATENT DOCUMENTS

| | | | |
|---|---|---|---|
| 6,407,146 B1 | 6/2002 | Fujita | |
| 2004/0113311 A1 | 6/2004 | Hasegawa et al. | |

FOREIGN PATENT DOCUMENTS

| | | |
|---|---|---|
| EP | 1 000 980 | 5/2000 |
| JP | 61-233043 | 10/1986 |
| JP | 55-009669 | 1/1989 |
| JP | 1-29821 | 6/1989 |
| JP | 03-047871 | 2/1991 |
| JP | 05-059289 | 3/1993 |
| JP | 05-287186 | 11/1993 |
| JP | 8-20723 | 1/1996 |
| JP | 8-48888 | 2/1996 |
| JP | 8-253761 | 10/1996 |
| JP | 9-3333 | 1/1997 |
| JP | 10-72540 | 3/1998 |
| JP | 2832222 | 10/1998 |
| JP | 11-080571 | 3/1999 |
| JP | 11-100433 | 4/1999 |
| JP | 11-116686 | 4/1999 |
| JP | 11-116763 | 4/1999 |
| JP | 2000-191912 | 7/2000 |
| JP | 2001-234072 | 8/2001 |
| JP | 2001-262122 | 9/2001 |
| JP | 2001-262125 | 9/2001 |
| JP | 2001-271055 | 10/2001 |
| JP | 2001-271057 | 10/2001 |
| JP | 2001-316509 | 11/2001 |
| JP | 2001-354830 | 12/2001 |
| JP | 2001-354846 | 12/2001 |
| JP | 2002-129004 | 5/2002 |
| JP | 2002-536486 | 10/2002 |
| JP | 2002-363537 | 12/2002 |
| JP | 2003-055429 | 2/2003 |
| JP | 2003-089742 | 3/2003 |
| JP | 2003-113324 | 4/2003 |
| JP | 2003-119219 | 4/2003 |
| JP | 2003-147207 | 5/2003 |
| JP | 2003-313397 | 6/2003 |
| JP | 2004-002604 | 1/2004 |
| JP | 2004-083606 | 3/2004 |
| JP | 2004-099877 | 4/2004 |
| JP | 2005-113066 | 4/2005 |
| JP | 2005-179564 | 7/2005 |
| JP | 2005-206632 | 8/2005 |
| JP | 2005206632 A * | 8/2005 |
| JP | 2005-290242 | 10/2005 |
| JP | 2005-290243 | 10/2005 |
| JP | 2005-290244 | 10/2005 |
| WO | 99/05216 | 2/1999 |
| WO | 00/46302 | 8/2000 |

OTHER PUBLICATIONS

International Search Report issued Jan. 10, 2006 in the International (PCT) Application of which the present application is the U.S. National Stage.

\* cited by examiner

*Primary Examiner* — David W Wu
*Assistant Examiner* — Marie Reddick
(74) *Attorney, Agent, or Firm* — Wenderoth, Lind & Ponack, L.L.P.

(57) ABSTRACT

Disclosed is a curable composition including an organic polymer containing a crosslinkable silyl group, an ultraviolet ray absorbing agent having a triazine skeleton and a hindered amine based light stabilizer. The composition exhibits improved weather resistance in a thin layer and thick layer portion. Further, disclosed is a curable composition including an organic polymer containing a crosslinkable silyl group, a (meth)acrylic polymer containing an epoxy group, a divalent tin organic carboxylate and an organic amine compound. The composition exhibits excellent properties. Also, disclosed is a curable composition and sealing material including a reactive organic polymer containing at least one crosslinkable silyl group in one molecule thereof, a reactive organic polymer containing less than one crosslinkable silyl group in one molecule thereof, and thermally expandable hollow spheres. The composition has good physical properties. Also, disclosed is a fire-resistant structure forming method.

11 Claims, 1 Drawing Sheet

CURABLE COMPOSITION

This application is a divisional of Ser. No. 11/992,404, filed Mar. 21, 2008, now abandoned, which is a 371 U.S. national stage of International Application No. PCT/JP2005/017709 filed Sep. 27, 2005, herein incorporated by reference in their entirety.

TECHNICAL FIELD

The present invention firstly relates to a curable composition excellent in weather resistance, and a sealing material using the curable composition as an available ingredient and excellent in weather resistance. The present invention secondly relates to a curable composition excellent in restoring property, durability, weather resistance, and paint anti-staining property, and a sealing material using the curable composition as an available ingredient. The present invention thirdly relates to a curable composition excellent in fire resistance, a sealing material using the curable composition as an available ingredient and having fire resistance, and a method of forming a fire-resistant structure involving the use of the sealing material.

BACKGROUND ART

A sealing material has been conventionally blended with a stabilizer in order that weather resistance may be imparted to the material. However, irrespective of the above fact, such whitening problems as described below occur, and have been serious problems to be solved in the field of sealing material construction. One of the whitening problems is as described below. When a masking tape is stuck on a portion apart from a joint of an adherend due to an error in construction at the time of the placement of the sealing material, thin layer parts are formed after spatulation for flattening the surface of the sealing material at a joint portion, and the thin layer parts each deteriorate to whiten more quickly than the sealing material at the joint portion, with the result that the appearance of a structure becomes poor, and the design of the structure becomes extremely bad.

At present, there is no technology for solving the whitening phenomenon of those thin layer parts (hereinafter collectively referred to as "thin layer portion"). Details about the foregoing are as described below. Conventionally known examples of a stabilizer having good weather resistance to be blended into the sealing material include a combination of a benzotriazole based ultraviolet ray absorbing agent and a hindered phenol based antioxidant as described in Patent Document 1, a combination of a benzotriazole based ultraviolet ray absorbing agent and a specific hindered amine based light stabilizer as described in Patent Document 2, and a combination of a benzotriazole based ultraviolet ray absorbing agent and a hindered amine based light stabilizer containing a specific triazine skeleton as described in Patent Document 3. Those stabilizers are effective for, for example, sealing materials at thick (for example, 5 mm or more in thickness) joint portions (hereinafter collectively referred to as "thick layer portion"), but none of those stabilizers is effective for the thin layer portion, and no stabilizer formulation capable of improving the weather resistance of the thin layer portion and that of the thick layer portion simultaneously is known.

In view of the foregoing, in the field of sealing materials, there is a demand for a sealing material designed so that a thin layer portion is prevented from deteriorating to whiten more quickly than a thick layer portion, and, at the same time, the thick layer portion exerts excellent weather resistance. Patent Document 4 describes that a combination of a benzotriazole based ultraviolet ray absorbing agent, a hindered amine based compound having a molecular weight of 200 to 1,000 and free of a triazine skeleton in any one of its molecules, and a hindered amine compound having a triazine skeleton in any one of its molecules as light stabilizers is a stabilizer formulation having good weather resistance in each of a thin layer portion, and a thick layer portion. However, it cannot yet be said that the weather resistance is sufficient.

In addition, an oxypropylene polymer having a crosslinkable silyl group capable of curing into a rubber-like substance by virtue of moisture or the like has been conventionally utilized, for example, in an elastic sealant for structures or the like. In this case, a composition obtained by blending the polymer with a plasticizer, a filler, and the like has been utilized in terms of physical properties and of cost. The restoring property of the sealant for filling a joint of the structure plays an important role in following the fluctuation of the joint due to a humidity difference.

Various investigations have been conducted on a curable composition excellent in restoring property (see, for example, Patent Documents 5 and 6). However, the physical properties of the composition such as weather resistance and paint anti-staining property have been poor.

Further, a curable resin composition having fire resistance has been currently produced on an industrial scale, and has been finding use in a wide variety of fields including structure-, automobile-, and electric machinery-related fields. In particular, in a sealing material application, a sealing material superior in fire resistance compared to a conventional one has been requested in association with the recent increase of interest in safety.

Sealing materials each containing a polyphosphate compound as a foaming agent have been known as examples of fire resistant sealing materials that have already been on the market. Of the materials, a material containing ammonium polyphosphate is effective; the generation of an ammonia gas caused by the hydrolysis of the material and phosphorus in the material promote the carbonization of any other substance to cause the substance to produce an incombustible carbonized layer, whereby the material has fire resistance (see, for example, Patent Documents 7 and 8).

However, none of the sealing materials each containing a polyphosphate compound can obtain predetermined fire resistance unless the loading of the polyphosphate compound is equal to or higher than a certain level. Moreover, blending each of the sealing materials with the polyphosphate compound involves the following problems: reductions in physical properties of each of the sealing materials and an increase in cost for the production of each of the sealing materials.

In addition, a sealing material obtained by adding a foaming agent to a vinyl based organic polymer has been known as examples of any other sealing material having fire resistance; the material is formed on the basis of the vinyl based organic polymer having good heat resistance, and the foaming agent in the material expands or generates a gas to form a foaming layer having heat insulating property, whereby the material has fire resistance (see, for example, Patent Document 9).

However, the vinyl based organic polymer is inherently poor in elongation property. In addition, blending the vinyl based organic polymer with the foaming agent involves the following problem: additional reductions in the physical properties of the polymer.

In addition, from the viewpoint of fire resistance, a method of making a part other than a sealing material (mainly a back-up material) fire-resistant has been employed for the purpose of imparting fire resistance to a joint portion. To be specific, the following method has been known: a foaming asbestos body cut to be adjusted to be the width of a joint (for example, trade name "Litoflex" manufactured by NICHIAS Corporation) is inserted under pressure into the bottom of the joint, and, furthermore, an ordinary sealing material is loaded into the upper portion of the resultant, whereby compatibility between fire resistance and water resistance is achieved.

However, such method must be executed by an expert in order that fire resistance may not vary from place to place, and requires the following complicated operation: the body must be cut to be adjusted to be a joint shape that varies from place to place. As a result, the method is extremely costly.

A silicone based sealing material different from the present invention in composition has also been attracting attention because of its excellent flame resistance. However, the material involves the following problems: the material is poor in coating property, and causes water-repellent staining.

Patent Document 1: JP 5-287186 A
Patent Document 2: JP61-233043A
Patent Document 3: JP8-48888A
Patent Document 4: JP2001-271057A
Patent Document 5: JP55-9669A
Patent Document 6: JP01-29821B
Patent Document 7: JP2832222B
Patent Document 8: JP8-253761A
Patent Document 9: JP2001-354830A

DISCLOSURE OF THE INVENTION

Problems to be Solved by the Invention

A first object of the present invention is to provide a curable composition and a sealing material each having improved weather resistance in each of a thin layer portion and a thick layer portion. A second object of the present invention is to provide a curable composition and a sealing material each of which are excellent in weather resistance, paint anti-staining property, restoring property, and durability. A third object of the present invention is to provide an excellent curable composition and an excellent sealing material each having economical productivity, good physical properties, safety, and fire resistance. Another object of the present invention is to provide a method of forming a fire-resistant structure with ease at a low cost.

Means for Solving the Problems

To solve the above-mentioned problems, according to a first aspect of a curable composition of the present invention, the curable composition comprises: (A) an organic polymer containing a crosslinkable silyl group; (B) an ultraviolet ray absorbing agent having a triazine skeleton; and (C) a hindered amine based light stabilizer. A curable composition having improved weather resistance in each of a thin layer portion and a thick layer portion can be obtained from the curable composition of the present invention.

(A) The organic polymer containing a crosslinkable silyl group is preferably one or more kinds of compounds selected from the group consisting of a polyoxyalkylene based polymer containing a crosslinkable silyl group, a (meth)acrylic-modified polyoxyalkylene based polymer containing a crosslinkable silyl group, and a (meth)acrylic polymer containing a crosslinkable silyl group, or is more preferably a (meth)acrylic polymer having a crosslinkable silyl group at a terminal of its molecular chain, or the mixture of the (meth) acrylic polymer having a crosslinkable silyl group at a terminal of its molecular chain and a polyoxyalkylene based polymer containing a crosslinkable silyl group. It should be noted that the terms "acrylic" and "methacrylic" are collectively referred to as "(meth)acrylic" in the present invention.

A method of producing the (meth)acrylic polymer having a crosslinkable silyl group at a terminal is not particularly limited; a controlled radical polymerization method is preferable, a living radical polymerization method is more preferable, and an atom transfer radical polymerization method is still more preferable.

In the first aspect of the curable composition of the present invention, the curable composition suitably further contains (D) a compound that reacts with water to produce an amine compound. Thus, a curable composition excellent in anti-staining property as well as weather resistance can be obtained.

As (C) the hindered amine based light stabilizer, a hindered amine based compound having a triazine skeleton or a hindered amine based compound free of a triazine skeleton may be used. In addition, as (C) the hindered amine based light stabilizer, a mixture of a hindered amine based compound having a triazine skeleton and a hindered amine based compound free of a triazine skeleton may be used.

According to a first aspect of a sealing material of the present invention, the sealing material comprises the first aspect of the curable composition of the present invention as an available ingredient, and has excellent weather resistance.

According to a second aspect of a curable composition of the present invention, the curable composition comprises: (E) an organic polymer containing a crosslinkable silyl group; (F) a (meth)acrylic polymer containing an epoxy group; (G) a divalent tin organic carboxylate; and (H) an organic amine compound. A curable composition excellent in weather resistance, paint anti-staining property, restoring property, and durability can be obtained from the curable composition of the present invention.

(E) The organic polymer containing a crosslinkable silyl group is preferably a (meth)acrylic polymer containing a crosslinkable silyl group. The (meth)acrylic polymer containing a crosslinkable silyl group is preferably a (meth) acrylic organic polymer having a crosslinkable silyl group at a terminal of its molecular chain, or the mixture of the (meth) acrylic polymer having a crosslinkable silyl group at a terminal of its molecular chain and an organic polymer containing a crosslinkable silyl group. A method of producing the (meth) acrylic polymer having a crosslinkable silyl group at a terminal is not particularly limited; a controlled radical polymerization method is preferable, a living radical polymerization method is more preferable, and an atom transfer radical polymerization method is still more preferable.

(F) the (meth)acrylic polymer containing an epoxy group has a weight average molecular weight within the range of preferably 1,000 to 7,500.

According to a second aspect of a sealing material of the present invention, the sealing material comprises the second aspect of the curable composition of the present invention as an available ingredient, and is excellent in weather resistance, paint anti-staining property, restoring property, and durability.

According to a third aspect of a curable composition of the present invention, the curable composition comprises: (I) a reactive organic polymer containing at least one crosslinkable silyl group in any one of its molecules; (J) a reactive organic polymer containing less than one crosslinkable silyl group in any one of its molecules; and (K) thermally expandable hollow spheres as essential components, wherein the curable composition contains the component (K) in an amount within the range of 0.01 part by mass to 20 parts by mass with respect to a total of 100 parts by mass of the components (I) and (J). An excellent curable composition having economical productivity, good physical properties, safety, and fire resistance can be provided by the curable composition of the present invention.

(I) The reactive organic polymer containing at least one crosslinkable silyl group in any one of its molecules is preferably a (meth)acrylic polymer containing a crosslinkable silyl group. The (meth)acrylic polymer containing a crosslinkable silyl group is preferably a (meth)acrylic polymer having a crosslinkable silyl group at a terminal of its molecular chain, or the mixture of the (meth)acrylic polymer having a crosslinkable silyl group at a terminal of its molecular chain and a polyoxyalkylene based polymer containing a crosslinkable silyl group.

A method of producing the (meth)acrylic polymer having a crosslinkable silyl group at a terminal is not particularly limited; a controlled radical polymerization method is preferable, a living radical polymerization method is more preferable, and an atom transfer radical polymerization method is still more preferable.

(J) The reactive organic polymer containing less than one crosslinkable silyl group in any one of its molecules is suitably a (meth)acrylic polymer. In addition, (J) the reactive organic polymer containing less than one crosslinkable silyl group in any one of its molecules has a weight average molecular weight of preferably 2,000 to 50,000.

According to the third aspect of the curable composition of the present invention, the curable composition contains the component (J) in an amount of preferably 10 to 300 parts by weight with respect to 100 parts by weight of the component (I).

In the third aspect of the curable composition of the present invention, the hardness of a rubber-like elastic body after the curing of the composition measured with a rubber hardness meter (JIS A type) is preferably 40 or less.

According to the third aspect of the sealing material of the present invention, the sealing material comprises the third aspect of the curable composition of the present invention as an available ingredient, and has excellent fire resistance.

A forming method of the present invention comprises forming a fire-resistant structure using a wall material having fire resistance and the sealing material having fire resistance according to the present invention.

Effect of the Invention

Firstly, according to the present invention, a curable composition and a sealing material each having improved weather resistance in each of a thin layer portion and a thick layer portion can be obtained. Further, according to the present invention, a curable composition and a sealing material each of which is excellent in anti-staining property as well as weather resistance and has a high elongation rate can also be obtained.

Secondly, according to the present invention, a curable composition which is excellent in weather resistance, paint anti-staining property, restoring property, and durability and which is suitably used particularly in, for example, a sealing material for the structure can be obtained. In addition, according to the present invention, a sealing material excellent in weather resistance, paint anti-staining property, restoring property, and durability can be obtained. Further, according to the present invention, in addition to the above effects, there can be obtained a curable composition which has a high elongation rate and is suitably used in a sealing material, and a sealing material having a high elongation rate.

Thirdly, according to the present invention, there can be provided an excellent curable composition which has economical productivity, good physical properties, safety, and fire resistance. Further, according to the present invention, a curable composition having a high elongation rate as well as the above effects can be obtained. The third aspect of the curable composition of the present invention is most suitably used in a sealing material; the composition can be used in, for example, an adhesive, a pressure-sensitive adhesive, a coating material, or a potting material as long as the composition is used in applications where fire resistance is expected from the composition. The sealing material having fire resistance of the present invention exerts the following significant effects: the sealing material maintains good physical properties, has high cost performance, can be applied, does not cause water-repellent staining, and can be turned into a one-component liquid. Furthermore, the sealing material forms a foaming heat insulating layer when exposed to flame to shield, for example, heat, flame, smoke, and a gas generated by combustion. According to the formation method of the present invention, a fire-resistant structure can be formed with ease at a low cost.

Any one of the first to third aspects of the curable composition of the present invention is particularly suitably used in a sealing material; any one of the aspects can be used in, for example, an adhesive, a pressure-sensitive adhesive, a coating material, or a potting material. The curable composition of the present invention can be used for, for example, various structures, automobiles, civil engineering, and electrical and electronic fields.

Figure 1:
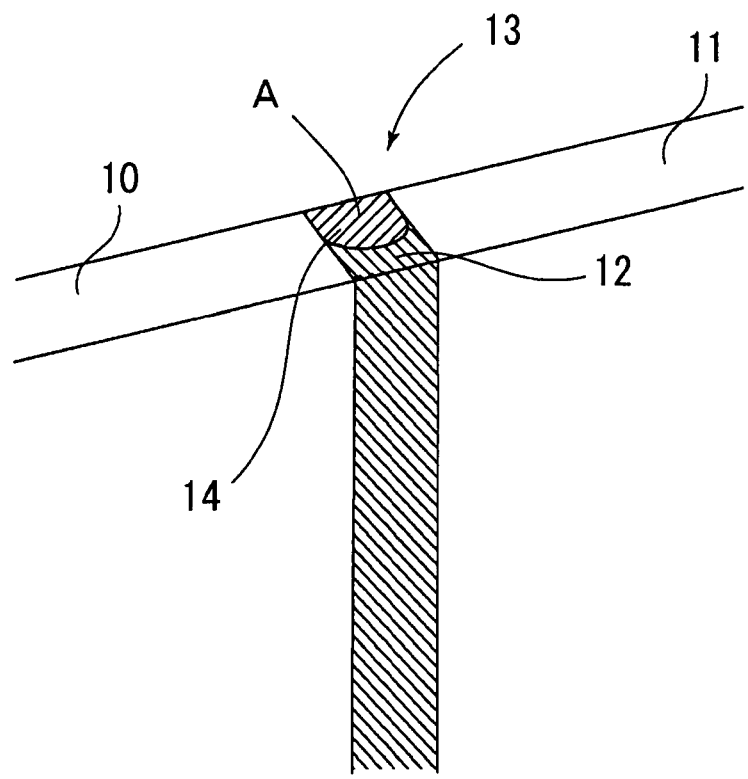
FIG. 1 is a schematic explanatory view showing an example of a fire-resistant structure to be formed by a formation method of the present invention.

DESCRIPTION OF REFERENCE NUMERALS 10, 11: wall materials, 12: a sealing material, 13: a fire-resistant structure, 14: a filler, A: an abutting portion

BEST MODE FOR CARRYING OUT THE INVENTION

Hereinafter, an embodiment of the present invention will be described with reference to the attached drawings. Needless to say, however, the shown examples are merely exemplary, and various modifications can be made without departing from the technical idea of the present invention.

The first aspect of the curable composition of the present invention comprises the following components (A), (B) and (C):

(A) an organic polymer containing a crosslinkable silyl group;

(B) an ultraviolet ray absorbing agent having a triazine skeleton; and (C) a hindered amine based light stabilizer.

An organic polymer containing a silicon-containing group having a hydroxyl group or a hydrolyzable group bonded to a silicon atom and capable of crosslinking by the formation of a siloxane bond, that is, a crosslinkable silyl group is used as the component (A). Examples of such an organic polymer containing crosslinkable silyl group-containing (A) include those disclosed in JP5-287186A, JP61-233043A, JP1-58219B, JP3062625B, JP8-337713A, JP2003-138151A, JP11-12480A, JP52-73998A, JP55-9669A, JP59-122541A, JP60-6747A, JP63-112642A, JP03-79627A, JP04-283259A, JP05-70531A, JP11-80571A, JP11-116763A, JP11-130931A, JP2001-40037A, JP3313360B, JP2004-51830A, JP2004-59782A, JP2001-329065A, and JP2001-271055A. Specific examples of the organic polymer containing a crosslinkable silyl group (A) include a polyoxyalkylene based polymer, a vinyl-modified polyoxyalkylene based polymer, a vinyl based polymer, a polyester polymer, and a (meth)acrylate polymer each of which contains a crosslinkable silyl group and the main chain of each of which may contain organosiloxane, and a copolymer or mixture of two or more of them.

One molecule of the polymer generally contains 1 to 6 crosslinkable silyl groups in terms of, for example, the curing property of the composition and the physical properties of the composition after the curing of the composition, though the number of the groups is not particularly limited. Further, the crosslinkable silyl group is preferably a group represented by the following general formula (1) because the group can be easily crosslinked, and can be easily produced:

[Chemical formula 1]

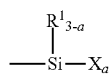

(1)

[where $R^1$ represents a substituted or unsubstituted, monovalent organic group having 1 to 20 carbon atoms, preferably represents an alkyl group having 1 to 20 carbon atoms, an aryl group having 6 to 20 carbon atoms, or an aralkyl group having 7 to 20 carbon atoms, or most preferably represents a methyl group, and, when multiple $R^1$'s are present, the multiple $R^1$'s may be identical to or different from each other, X represents a hydroxyl group or a hydrolyzable group, preferably represents a group selected from a halogen atom, a hydrogen atom, a hydroxyl group, an alkoxy group, an acyloxy group, a ketoximate group, an amide group, an acid amide group, a mercapto group, an alkenyloxy group, and an aminooxy group, more preferably represents an alkoxy group, or most preferably represents a methoxy group, and, when multiple X's are present, the multiple X's may be identical to or different from each other, and a represents 1, 2, or 3, or most preferably represents 2.]

When multiple crosslinkable silyl groups are present in the organic polymer containing a crosslinkable silyl group (A), the groups may be identical to or different from each other. Further, the numbers of a in the formula (1) may be identical to or different from each other. In addition, two or more kinds of organic polymers containing different crosslinkable silyl groups may be used.

The main chain of the organic polymer containing a crosslinkable silyl group (A) is preferably, for example, a polyoxyalkylene based polymer, (meth)acrylic-modified polyoxyalkylene polymer, or (meth)acrylic polymer which may contain organosiloxane, or a copolymer or mixture of two or more of them in terms of physical properties such as tensile strength and modulus after the curing of the composition.

In addition, the organic polymer containing a crosslinkable silyl group (A) is particularly preferably a vinyl based polymer having a crosslinkable silyl group at a terminal, or is more preferably a (meth)acrylic polymer having a crosslinkable silyl group at a terminal, or the mixture of the (meth)acrylic polymer having a crosslinkable silyl group and a polyoxyalkylene based polymer having a crosslinkable silyl group. The use of the (meth)acrylic polymer having a crosslinkable silyl group at a terminal of any one of its molecules as the component (A) can achieve a high elongation rate particularly useful in a sealing material.

A method of producing the organic polymer containing a crosslinkable silyl group (A) is not particularly limited, and a known synthesis method can be utilized. When a polymer which contains a crosslinkable silyl group and the main chain of which is a vinyl based polymer such as an acrylic polymer is used as the organic polymer containing a crosslinkable silyl group, a vinyl based polymer synthesized by a radical polymerization method is preferably used.

The radical polymerization methods are classified into a general radical polymerization method involving merely copolymerizing a monomer having a specific functional group and a vinyl based monomer by using an azo based compound, a peroxide, or the like as a polymerization initiator and a controlled radical polymerization method by which a specific functional group can be introduced to a controlled position such as a terminal. In the present invention, a vinyl based polymer synthesized by the controlled radical polymerization method is more effective than a polymer synthesized by the former method.

The controlled radical polymerization methods are further classified into a chain transfer agent method by which a vinyl based polymer having a specific functional group at a terminal can be obtained as a result of polymerization using a chain transfer agent having the functional group and a living radical polymerization method by which a polymerization growth terminal grows without causing a termination reaction or the like.

The living radical polymerization method is particularly preferable because a polymer having an arbitrary molecular weight, a narrow molecular weight distribution, and a low viscosity can be obtained, and a monomer having a specific functional group can be introduced to an arbitrary position. It should be noted that, in the present invention, living polymerization includes pseudo-living polymerization in which a molecular chain with an inactivated terminal and a molecular chain with an activated terminal grow while they are in an equilibrium state in addition to polymerization in which a molecular chain grows while a terminal of the chain continues to have activity at all times.

Examples of the living radical polymerization method include: a method involving the use of a cobalt porphyrin complex as disclosed in J. Am. Chem. Soc., 1994, vol. 116, p. 7943; a method involving the use of a radical scavenger such as a nitroxide compound as disclosed in Macromolecules, 1994, vol. 27, p. 7228; and an atom transfer radical polymerization (ATRP) method involving polymerizing a vinyl based monomer by using an organic halogen compound, a halogenated sulfonyl compound, or the like as an initiator and a transition metal complex as a catalyst as disclosed in J. Am. Chem. Soc., 1995, vol. 117, p. 5614, Macromolecules, 1995, vol. 28, p. 7901, Science, 1996, vol. 272, p. 866, Macromolecules, 1995, vol. 28, p. 1721, WO96/30421, WO97/18247, WO98/01480, WO98/40415, JP9-208616A, or JP8-41117A. The living radical polymerization method, which is not particularly limited, is preferably the atom transfer radical polymerization method. It should be noted that, in the present invention, the atom transfer radical polymerization method includes a reverse atom transfer radical polymerization method, that is, a method involving causing a general radical initiator such as a peroxide to act on a high oxide state when an ordinary atom transfer radical polymerization catalyst generates a radical such as Cu(II') when Cu(I) is used as a catalyst to produce equilibrium similar to that of atom transfer radical polymerization as a result of the action (see, for example, Macromolecules, 1999, vol. 32, p. 2872).

Examples of the chain transfer agent method include: a method involving the use of a halogenated hydrocarbon as a chain transfer agent to obtain a polymer having a halogen at a terminal as disclosed in JP4-132706A; and a method involving the use of, for example, a hydroxyl group-containing mercaptan or a hydroxyl group-containing polysulfide as a chain transfer agent to obtain a polymer having a hydroxyl group at a terminal as disclosed in JP61-271306A, JP2594402B, or JP54-47782A.

Hereinafter, the atom transfer radical polymerization method will be described. An organic halide, in particular, an organic halide having a highly reactive carbon-halogen bond (such as a carbonyl compound having a halogen at α-position or a compound having a halogen at a benzyl position), a halogenated sulfonyl compound, or the like is used as an initiator for the atom transfer radical polymerization method.

In addition, an organic halide or halogenated sulfonyl compound having a functional group except a functional group for initiating atom transfer radical polymerization such as an alkenyl group, a crosslinkable silyl group, a hydroxyl group, an epoxy group, an amino group, or an amide group can also be used as an initiator for the polymerization. In this case, a vinyl based polymer having the functional group at one main chain terminal and the growth terminal structure of the atom transfer radical polymerization at the other main chain terminal is synthesized. In the present invention, an organic halide or halogenated sulfonyl compound having a crosslinkable silyl group is preferably used. In this case, a polymer having the crosslinkable silyl group at one terminal and a halogen at the other terminal is obtained, and a polymer having crosslinkable silyl groups at both terminals can be obtained by substituting the halogen terminal.

The vinyl based monomer to be used in the polymerization is not particularly limited; in the present invention, one or more kinds of acrylic monomers such as (meth)acrylic acid, a (meth)acrylate, (meth)acrylonitrile, and (meth)acrylamide are preferably used as main components, and a (meth)acrylate such as an alkyl(meth)acrylate or an alkoxyalkyl(meth)acrylate is more preferably used as a main component.

The transition metal complex to be used as a polymerization catalyst is not particularly limited; a metal complex using an element belonging to Group 7, 8, 9, 10, or 11 in the periodic table as a central metal is preferable, a complex of zero-valent copper, monovalent copper, divalent ruthenium, divalent iron, or divalent nickel is more preferable, and a complex of copper is particularly preferable.

A monovalent copper compound is, for example, cuprous chloride, cuprous bromide, cuprous iodide, cuprous cyanide, cuprous oxide, or cuprous perchlorate. When the copper compound is used, any one of the ligands such as 2,2'-bipyridyl and a derivative of 2,2'-bipyridyl, 1,10-phenanthroline and a derivative of 1,10-phenanthroline, and polyamines such as tetramethylethylene diamine, pentamethyl diethylene triamine, and hexamethyltris(2-aminoethyl)amine is added to the compound for improving the catalytic activity of the compound.

In addition, a tristriphenylphosphine complex of divalent ruthenium chloride [RuCl$_2$(PPh$_3$)$_3$], a bistriphenylphosphine complex of divalent iron [FeCl$_2$(PPh$_3$)$_2$], a bistriphenylphosphine complex of divalent nickel [NiCl$_2$(PPh$_3$)$_2$], and a bistributylphosphine complex of divalent nickel [NiBr$_2$(PBu$_3$)$_2$] are also suitably used as catalysts. When a ruthenium compound is used as a catalyst, any one of the aluminum alkoxides is added as an activator.

The polymerization can be performed in the absence of a solvent or in any one of various solvents. The polymerization is performed in the temperature range of preferably 0 to 200° C., or more preferably room temperature to 150° C.

An acrylic polymer having a halogen at a terminal is produced by the radical polymerization of a vinyl based monomer mainly composed of an acrylic monomer using an organic halogen compound, a halogenated sulfonyl compound, or the like as an initiator and a transition metal complex as a catalyst. The (meth)acrylic polymer having a crosslinkable silyl group at a terminal of its molecular chain to be used in the present invention can be obtained by transforming the halogen of the acrylic polymer having the halogen at a terminal into the crosslinkable silyl group. A method for the transformation is not particularly limited, and a known method (see, for example, JP11-80571A, JP11-116763A, JP11-130931A, JP2004-51830A, JP2004-59782A, JP2001-329065A, or JP2001-271055A) can be employed.

In the present invention, the organic polymer containing a crosslinkable silyl group (A) desirably has a number average molecular weight of 1,000 or more to 100,000 or less, in particular, 3,000 to 50,000 and a narrow molecular weight distribution because the viscosity of the polymer before the curing of the composition is so low that the polymer can be easily handled, and the physical properties of the composition after the curing of the composition such as strength, an elongation rate, and a modulus are suitable. Only one kind of the organic polymer containing a crosslinkable silyl group (A) may be used, or two or more kinds of such polymers may be used in combination.

The component (B) is not particularly limited as long as the component is an ultraviolet ray absorbing agent having a triazine skeleton, and any one of a wide variety of known compounds can be used as the component. Specific suitable examples of the component (B) include triazine based compounds each represented by the following formula (2):

[Chemical formula 2]

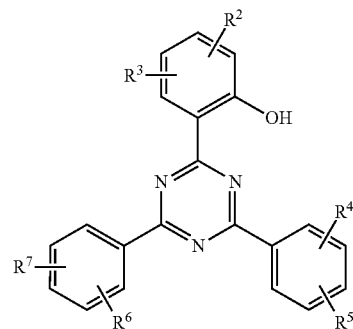

(2)

[where $R^2$ to $R^7$ each independently represent a hydrogen atom, a hydroxyl group, a halogen atom, or a substituted or unsubstituted, monovalent organic group, or preferably a hydrogen atom, a hydroxyl group, a halogen atom, an alkyl group having 1 to 18 carbon atoms, or an alkoxy group having 1 to 18 carbon atoms.]

In particular, a 2-(2-hydroxyphenyl)-1,3,5-triazine based compound in which $R^2$ in the formula (2) represents a hydrogen atom, a polymerizable triazine compound represented by the following general formula (3), or the like is preferable:

[Chemical formula 3]

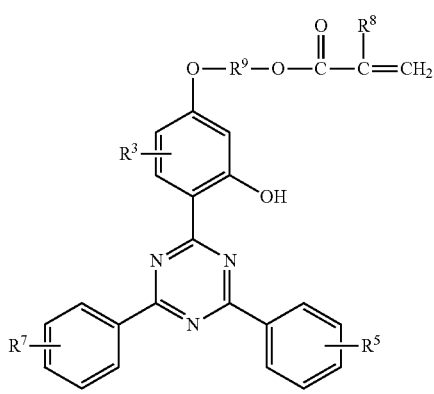

(3)

[where $R^3$, $R^5$, and $R^7$ each have the same meaning as that described above, or each preferably represent a hydrogen atom or an alkyl group having 1 to 6 carbon atoms, $R^8$ represents a hydrogen atom or a methyl group, and $R^9$ represents a substituted or unsubstituted, divalent organic group, or preferably an alkylene group having 1 to 6 carbon atoms, a —($—CH_2CH_2—O—$)m group (m represents an integer of 1 to 5), or a —$CH_2CH(OH)—CH_2O$— group.]

Examples of the 2-(2-hydroxyphenyl)-1,3,5-triazine-based compound include 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxyl-4-propyloxyphenyl)-6-(2,4-dimethylphenyl)-1,3,5-tri azine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-tri azine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine represented by the following formula (4),

[Chemical formula 4]

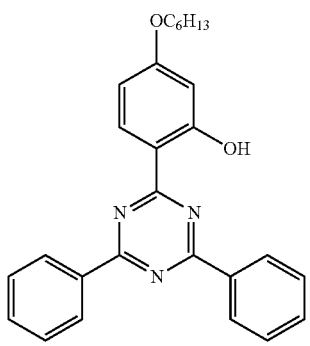

(4)

2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2-(2-methoxyphenyl)-4-(2-hydroxyphenyl)-6-phenyl-1,3,5-triazine represented by the following formula (5),

[Chemical formula 5]

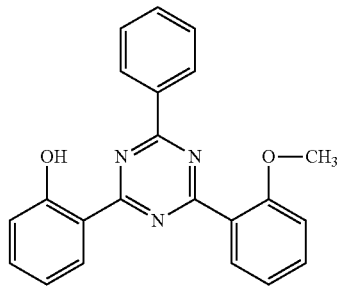

(5)

2,4-bis(2-methoxyphenyl)-6-(2-hydroxyphenyl)-1,3,5-triazine represented by the following formula (6),

[Chemical formula 6]

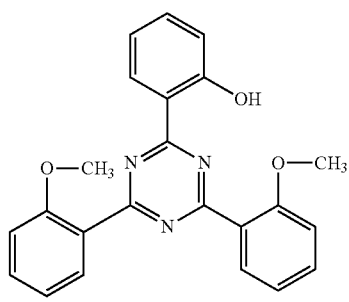

(6)

and compounds represented by the following general formulae (7) and (8).

[Chemical formula 7]

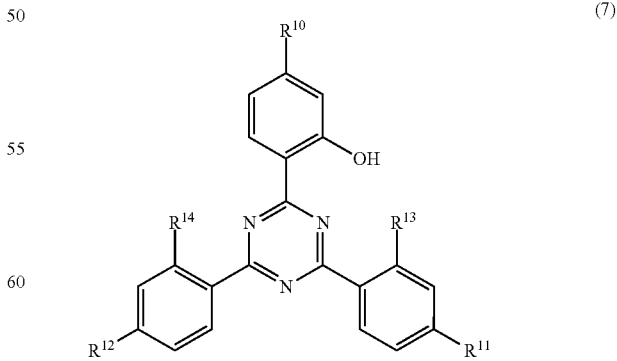

(7)

[where $R^{10}$ and $R^{11}$ each represent a methyl group or an alkoxy group having 1 to 8 carbon atoms, $R^{12}$ represents a hydrogen atom, a chlorine atom, a methyl group, or a methoxy group, and $R^{13}$ represents an alkoxy group having 1 to 8 carbon atoms, and $R^{14}$ represents a hydrogen atom or a methoxy group.]

[Chemical formula 8]

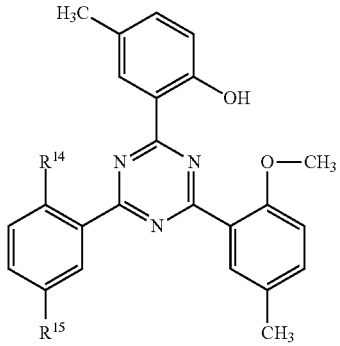

(8)

[where $R^{14}$ represents the same as described above, and $R^{15}$ represents a hydrogen atom or a methyl group.]

Examples of the polymerizable triazine compound include 2,4-diphenyl-6-[2-hydroxy-4-(2-acryloyloxyethoxy)]-s-triazine, 2,4-diphenyl-6-[2-hydroxy-4-(2-acryloyloxyethoxy)]-s-triazine, 2,4-bis(2-methylphenyl)-6-[2-hydroxy-4-(3-acryloyloxy-2-hydroxypropy oxy)]-s-triazine, 2,4-bis(2-methoxyphenyl)-6-[2-hydroxy-4-(2-acryloyloxyethoxy)-s-triazine, 2,4-bis(2-ethylphenyl)-6-[2-hydroxy-4-(2-acryloyloxyethoxy)]-s-triazine, 2,4-bis(2-ethoxyphenyl)-6,2-hydroxy-4-(2-acryloyloxyethoxy)]-s-triazine, 2,4-diphenyl-6-[2-hydroxy-4-(2-methacryloyloxyethoxy)]-s-triazine, 2,4-bis(2-methylphenyl)-6-[2-hydroxy-4-(2-methacryloyloxyethoxy)]-s-triazine, 2,4-bis(2-methoxyphenyl)-6-[2-hydroxy-4-(2-methacryloyloxyethoxy)]-s-triazine, 2,4-bis(2-ethylphenyl)-6-[2-hydroxy-4-(2-methacryloyloxyethoxy)]-s-triazine, 2,4-bis(2-ethoxyphenyl)-6-[2-hydroxy-4-(2-methacryloyloxyethoxy)]-s-triazine, 2,4-bis(2,4-dimethoxyphenyl)-6,2-hydroxy-4-(2-acryloyloxyethoxy)]-s-triazine, 2,4-bis(2,4-dimethylphenyl)-6-[2-hydroxy-4-(2-acryloyloxyethoxy)]-s-tri azine, 2,4-bis(2,4-diethoxyphenyl)-6-[2-hydroxy-4-(2-acryloyloxyethoxy)]-s-tri azine, and 2,4-bis(2,4-diethylphenyl)-6-[2-hydroxy-4-(2-acryloyloxyethoxy)]-s-triazine.

A ratio at which the above component (B) is blended is not particularly limited; the component is blended in an amount of preferably 0.1 to 50 parts by mass, or particularly preferably 1.0 to 10 parts by mass with respect to 100 parts by mass of the component (A). One kind of the above ultraviolet ray absorbing agent having a triazine skeleton may be used alone, or two or more kinds of such agents may be used in combination.

A hindered amine based compound having a triazine skeleton (C1) or a hindered amine based compound free of a triazine skeleton (C2) may be used as the component (C), that is, the hindered amine based light stabilizer without any particular limitation. Only one kind of such hindered amine based light stabilizer may be used, or two or more kinds of such stabilizers may be used in combination. When two or more kinds of such stabilizers are used in combination, the combination is not particularly limited, and the mixture of a hindered amine based compound having a triazine skeleton and a hindered amine based compound free of a triazine skeleton can also be used.

Examples of the hindered amine based compound (C1) having a triazine skeleton include a hindered amine compound having a triazine skeleton in any one of its molecules such as 1,5,8,12-tetrakis[4,6-bis{N-(2,2,6,6-tetramethyl-4-pyperidyl)butylamino}-1,3,5-triazine-2-yl]-1,5,8,12-tetraazadodecane, N,N',N",N'''-tetrakis[4,6-bis{butyl-(N-methyl-2,2,6,6-tetramethylpyperidine-4-yl)amino}-triazine-2-yl]-4,7-diazadecane-1,10-diamine, poly[{6-(1,1,3,3-tetramethylbutyl)amino-1,3,5-triazine-2,4-diyl}{(2,2,6,6-tetramethyl-4-pyperidyl)imino}hexamethylene{(2,2,6,6-tetramethyl-4-pyperidyl)imino}], N,N'-bis(3-aminopropyl)ethylenediamine/2,4-bis[N-butyl-N-(1,2,2,6,6-pentamethyl-4-pyperidyl)amino]-6-chloro-1,3,5-triazine condensate, a linear or cyclic condensate of N,N'-bis(2,2,6,6-tetramethyl-4-pyperidyl)hexamethylenediamine and 4-tertiary octylamino-2,6-dichloro-1,3,5-triazine, a linear or cyclic condensate of N,N'-bis(2,2,6,6-tetramethyl-4-pyperidyl)-hexamethylenediamine and 4-morpholino-2,6-dichloro-1,3,5-triazine, a condensate of 2-chloro-4,6-di(4-n-butylamino-2,2,6,6-tetramethylpyperidyl)-1,3,5-triazine and 1,2-bis(3-aminopropylamino)ethane, a condensate of 2-chloro-4,6-di(4-n-butylamino-1,2,2,6,6-pentamethylpyperidyl)-1,3,5-triazine and 1,2-bis(3-aminopropylamino)ethane, a condensate product of N,N'-bis-(2,2,6,6-tetramethyl-4-pyperidyl)hexamethylenediamine and 4-chlorohexylamino-2,6-dichloro-1,3,5-triazine, a condensation product of 1,2-bis(3-aminopropylamino)ethane, 2,4,6-trichloro-1,3,5-triazine and 4-butylamino-2,2,6,6-tetramethylpyperidine (CAS registered No. [136504-96-6]), and a polycondensation product of dibutylamine/1,3,5-triazine/N,N'-bis-(2,2,6,6-tetramethyl-4-pyperidyl)-1,6-hexamethylenediamine/N-(2,2,6,6-tetramethyl-4-pyperidyl)butylamine. Those hindered amine compounds having a triazine skeleton in the molecule may be used alone, or two or more thereof may be used in combination.

Examples of the hindered amine based compound free of a triazine skeleton (C2) include hindered amine compounds such as 2,2,6,6-tetramethyl-4-pyperidylstearate, 1,2,2,6,6-pentamethyl-4-pyperidylstearate, 2,2,6,6-tetramethyl-4-pyperidylbenzoate, N-(2,2,6,6-tetramethyl-4-pyperidyl)dodecyl succinimide, 1-[(3,5-ditertiarybutyl-4-hydroxyphenyl)propionyloxyethyl]-2,2,6,6-tetramethyl-4-pyperidinyl-(3,5-ditertiarybutyl-4-hydroxyphenyl)propionate, bis(2,2,6,6-tetramethyl-4-pyperidyl)sebacate, bis(1,2,2,6,6-pentamethyl-4-pyperidyl)sebacate, methyl-1,2,2,6,6-pentamethyl-4-pyperidylsebacate, bis(1,2,2,6,6-pentamethyl-4-pyperidyl)[[3,5-bis(1,1-dimethylethyl)-4-hydroxyphenyl]methyl]butyl malonate, a mixture of bis(1,2,2,6,6-pentamethyl-4-pyperidyl)sebacate and methyl-1,2,2,6,6-pentamethyl-4-pyperidylsebacate, N,N'-bis(2,2,6,6-tetramethyl-4-pyperidyl)hexamethylenediamine, tetra(2,2,6,6-tetramethyl-4-pyperidyl)butanetetracarboxylate, tetra(1,2,2,6,6-pentamethyl-4-pyperidyl)butanetetracarboxylate, bis(2,2,6,6-tetramethyl-4-pyperidyl).di(tridecyl) butanetetracarboxylate, bis(1,2,2,6,6-pentamethyl-4-pyperidyl).di(tridecyl)butanetetracarboxylate, 3,9-bis[1,1-dimethyl-2-{tris(2,2,6,6-tetramethyl-4-pyperidyloxycarbonyl oxy)butylcarbonyloxy}ethyl]-2,4,8,10-tetraoxaspiro[5.5]undecane, 1-(2-hydroxyethyl)-2,2,6,6-tetramethyl-4-pyperidinol/diemthylsuccinate condensate, N,N'-bis(2,2,6,6-tetramethyl-4-pyperidyl)hexamethylenediamine/dibromoethane condensate, bis(2,2,6,6-tetramethyl-4-pyperidyl)succinate, bis(1-octyloxy-2,2,6,6-tetramethyl-4-pyperidyl)sebacate, a condensate of bis(1,2,2,6,6-pentamethyl-4-pyperidyl)n-butyl-3,5-di-tertiarybutyl-4-hydroxybenzylmalonate, 1-(2-hydroxyethyl)-2,2,6,6-tetramethyl-4-hydroxypyperidine, and succinic acid, tris(2,2, 6,6-tetramethyl-4-pyperidyl)nitrilotriacetate, 1,1'-(1,2-ethanediyl)-bis(3,3,5,5-tetramethylpyperadinone), 4-benzoyl-2,2,6,6-tetramethylpyperidine, 4-benzoyloxy-2,2,6,6-tetramethylpyperidine, 4-stearyloxy-2,2,6,6-tetramethylpyperidine, bis(1,2,2,6,6-pentamethylpyperidyl)-2-n-butyl-2-(2-hydroxy-3,5-di-tertiarybutyl-benzyl)malonate, 3-n-octyl-7,7,9,9-tetramethyl-1,3,8-triazaspiro[4.5]decane-2,4-dione, bis(1-octyloxy-2,2,6,6-tetramethylpyperidyl) sebacate, bis(1-octyloxy-2,2,6,6-tetramethylpyperidyl) succinate, 8-acetyl-3-dodecyl-7,7,9,9-tetramethyl-1,3,8-triazaspiro[4.5]decane-2,4-dione, 3-dodecyl-1-(2,2,6,6-tetramethyl-4-pyperidyl)pyrrolidine-2,5-dione, 3-dodecyl-1-(1,2,2,6,6-pentamethyl-4-pyperidyl)-pyrrolidine-2,5-dione, a mixture of 4-hexadecyloxy-2,2,6,6-tetramethylpyperidine and 4-stearyloxy-2,2,6,6-tetramethylpyperidine, N-(1,2,2,6,6-pentamethyl-4-pyperidyl)-n-dodecylsuccimide, 2-undecyl-7,7,9,9-tetramethyl-1-oxa-3,8-diaza-4-oxo-spiro[4.5]decane, a reaction product of 7,7,9,9-tetramethyl-2-cycloundecyl-1-oxa-3,8-diaza-4-oxo-spiro[4.5]decane and epichlorohydroline, 1,1-bis(1,2,2,6,6-pentamethyl-4-pyperidyloxycarbonyl)-2-(4-methoxyphenyl)ethane, N,N'-bisformyl-N,N'-bis(2,2,6,6-tetramethyl-4-pyperidyl)-hexamethylenediamine; a diester of 4-methoxymethylene malonic acid and 1,2,2,6,6-pentamethyl-4-hydroxypyperidine, poly[methylpropyl-3-oxy-4-(2,2,6,6-tetramethyl-4-pyperidyl)] siloxane; a reaction product of maleic anhydride-α-olefine copolymer and 2,2,6,6-tetramethyl-4-aminopyperidine or 1,2,2,6,6-pentamethyl-4-aminopyperidine, [a reaction product (70%) of decane diacid bis(2,2,6,6-tetramethyl-1(octyloxy)-4-pyperidyl)ester, 1,1-dimethylethylhydroperoxide, and octane]-polypropylene (30%), and 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpyperidine. One kind of those hindered amine based compounds each of which is free of a triazine skeleton may be used alone, or two or more kinds of them may be used in combination.

A ratio at which the above component (C) is blended is not particularly limited; the component is blended in an amount of preferably 0.1 to 50 parts by mass, or particularly preferably 1.0 to 10 parts by mass with respect to 100 parts by mass of the component (A).

In the first aspect of the curable composition of the present invention, the curable composition suitably further contains (D) a compound that reacts with water to produce an amine compound because the anti-staining property of the composition can be significantly improved. Specific suitable examples of the above component (D) include ketimine compounds, enamine compounds, and/or aldimine compounds of amine compounds in terms of, for example, the easy availability of a raw material, storage stability, and reactivity with water.

Each of the above ketimine, enamine, and aldimine compounds can be obtained by a dehydration reaction between (D1) an amine compound and (D2) a carbonyl compound. A method of producing the above component (D) is not particularly limited, and a known method can be employed.

Examples of the above amine compound (D1) include, but not particularly limited to, a primary amine and/or a secondary amine, and an amine compound having at least one alkoxysilyl group in any one of its molecules. In particular, the amine compound having at least one alkoxysilyl group in any one of its molecules is preferable because of its particularly excellent adhesiveness.

Examples of the primary amine include: monoamines such as butylamine, hexylamine, heptylamine, 2-ethylhexylamine, octylamine, 3-methoxypropylamine, tetradecylamine, pentadecylamine, cetylamine, stearylamine, trimethylcyclohexylamine, benzylamine, and aniline; diamines such as ethylenediamine, 1,3-diaminopropane, 1,2-diaminopropane, 1,4-diaminobutane, hexamethylenediamine, 1,7-diaminoheptane, trimethylhexamethylene diamine, 1,8-diaminooctane, 1,9-diaminononane, 1,10-diaminodecane, 1,11-diaminoundecane, 1,12-diaminododecane, 1,13-diminonotridecane, 1,14-diaminotetradecane, 1,15-diminopentadecane, 1,16-diaminohexadecane, 1,17-diminoheptadecane, 1,18-diaminooctadecane, 1,19-diaminononadecane, 1,20-diaminoeicosane, 1,21-diaminoheneicosane, 1,22-diaminodocosane, 1,23-diaminotricosane, 1,24-diaminotetracosane, isophoronediamine, diaminodicyclohexylmethane, 3,9-bis(3 aminopropyl)-2,4,8,10-tetraoxaspiro[5.5]undecane, xylenediamine, phenylenediamine, diaminodiphenylmethane, diaminodiethylphenylmethane, polyoxyethylenediamine, and polyoxypropylenediamine; and polyamines such as tri(methylamino)hexane. Examples of the secondary amine include: monoamines such as dilaurylamine, distearylamine, and methyllaurylamine; and diamines such as N,N'-dilaurylpropylamine, N,N'-distearylbutylamine, N-butyl-N'-laurylethylamine, N-butyl-N'-laurylpropylamine, and N-lauryl-N'-stearylbutylamine. Examples of the mixture of primary and secondary amine include N-laurylpropylenediamine and N-stearylpropylenediamine. Examples of the mixture of primary and secondary polyamine include diethylenetriamine, triethylenetetramine, and methylaminopropylamine.

Examples of the above amine compound having at least one alkoxysilyl group in any one of its molecules include compounds each represented by the following general formula (9):

[Chemical formula 9]

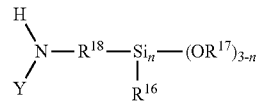

(9)

[where n=0, 1, or 2, $R^{16}$ and $R^{17}$ may be identical to or different from each other, and each represent a hydrocarbon group having 1 to 4 carbon atoms, $R^{18}$ represents a hydrocarbon group having 1 to 10 carbon atoms, and Y represents a hydrogen atom or an aminoalkyl group having 1 to 4 carbon atoms.]

Here, examples of the group represented by each of $R^{16}$ and $R^{17}$ include: alkyl groups such as methyl, ethyl, propyl, and butyl groups; and alkenyl groups such as vinyl, allyl, propenyl, and butenyl groups. In particular, an alkyl group is preferable. Examples of the group represented by $R^{18}$ include: alkylene groups such as methylene, ethylene, propylene, and butylene; arylene groups such as a phenylene group; and alkylenearylene groups. In particular, an alkylene group is preferable. n preferably represents 0 or 1.

Specific examples of the amine compound include: compounds represented by the following formulae (10) to (17); and aminosilanes typified by N-(β-aminoethyl)-γ-aminopropyltrimethoxysilane and N-(β-aminoethyl)-γ-aminopropylmethyldimethoxysilane. Of those, γ-aminopropyltrimethoxysilane, γ-aminopropyltriethoxysilane, γ-aminopropylmethyldimethoxysilane, N-(β-aminoethyl)-γ-aminopropyltrimethoxysilane, or the like is particularly preferable because in addition improved adhesiveness can be obtained.

[Chemical formula 10]

$(CH_3O)_3Si(CH_2)_3NH_2$ (10)

$(CH_3CH_2O)_3SiCH_2NH_2$ (11)

$(CH_3CH_2O)_3Si(CH_2)_3NH_2$ (12)

$(CH_3CH_2CH_2O)_3SiCH_2NH_2$ (13)

$(CH_3CH_2CH_2O)_3Si(CH_2)_6NH_2$ (14)

$(CH_3CH_2CH_2CH_2O)_3SiCH_2NH_2$ (15)

$(CH_3CH_2CH_2CH_2O)_3Si(CH_2)_6NH_2$ (16)

$(CH_3CH_2O)_3Si(CH_2)_3NH_2$
$|$
$CH_3$ (17)

The carbonyl compound (D2) includes known compounds, and examples thereof include, but not limited to: aldehydes such as acetaldehyde, propionealdehyde, n-butylaldehyde, isobutylaldehyde, n-amylaldehyde, isohexylaldehyde, diethylacetaldehyde, glyoxal, benzaldehyde, and phenylacetaldehyde; cyclic ketones such as cyclopentanone, trimethylcyclopentanone, cyclohexanone, methylcyclohexanone, and trimethylcyclohexanone; aliphatic ketones such as acetone, methylethylketone, methylpropylketone, methylisopropylketone, methylisobutylketone, methyl-tert-butylketone, diethylketone, dipropylketone, diisopropylketone, dibutylketone, and diisobutylketone; aromatic ketones such as acetophenone, benzophenone, and propiophenone; and β-dicarbonyl compound represented by the following general formula (18), such as acetylacetone, methyl acetoacetate, ethyl acetoacetate, dimethylmalonate, diethylmalonate, methylethylmalonate, and dibenzoylmethane.

Of those, methyl isobutyl ketone, dipropyl ketone, phenylacetaldehyde, and a β-dicarbonyl compound having an active methylene group [compound represented by the following general formula (18)] are more preferable:

[Chemical formula 11]

$R^{19}$—CO—$CH_2$—CO—$R^{20}$ (18)

[where $R^{19}$ and $R^{20}$ may be identical to or different from each other, and each represent an alkyl group having 1 to 16 carbon atoms (such as a methyl, ethyl, propyl, butyl, heptyl, hexyl, octyl, nonyl, decyl, undecyl, or hexadecyl group), an aryl group having 6 to 12 carbon atoms (such as a phenyl, tolyl, hexyl, or naphthyl group), or an alkoxyl group having 1 to 4 carbon atoms (such as a methoxy, ethoxy, propoxy, or butoxy group).]

The above compound that reacts with water to produce an amine compound having at least one alkoxysilyl group in any one of its molecules in the component (D) of the present invention is not particularly limited, and a compound obtained by a known production method can be used; a compound having a monomer purity of 50 to 95%, preferably 70 to 95%, or more preferably 80 to 95%, and an amino group sealing rate of 90% or more, or preferably 95% or more is suitably used.

A ratio at which the above component (D) is blended is not particularly limited; the component (D) is blended in an amount of preferably 0.05 to 50 parts by mass, or particularly preferably 1.0 to 20 parts by mass with respect to 100 parts by mass of the component (A). One kind of the above the compound that reacts with water to produce an amine compound may be used alone, or two or more kinds of such compounds may be used in combination.

In addition, in the first aspect of the curable composition of the present invention, the curable composition suitably further contains (D1) an amine compound and (D2) a carbonyl compound in order that the anti-staining property of the composition may be improved. The amine compound and the carbonyl compound exemplified in the description of the component (D) can be similarly used as the components (D1) and (D2), respectively. The above components (D1) and (D2) cause a dehydration reaction in the blend of the components. The dehydration reaction, which may be performed while a treatment such as a heat treatment is performed as required, can be advanced with the passage of time without the performance of any particular step.

A ratio at which each of the components (D1) and (D2) is blended is not particularly limited; each of the components (D1) and (D2) is blended in an amount of preferably 0.05 to 50 parts by mass, or particularly preferably 0.1 to 20 parts by mass with respect to 100 parts by mass of the component (A). Further, a ratio "[molar amount of component (D1)]/[molar amount of component (D2)]" is in the range of preferably 0.1 to 5.0, or more preferably 0.5 to 2.0. One kind of the amine or carbonyl compound may be used alone, or two or more kinds of such amine or carbonyl compounds may be used in combination.

In the first aspect of the curable composition of the present invention, the curable composition may be blended with any one of: substances such as an adhesion imparting agent, a physical property adjuster, a filler, a curing catalyst, a plasticizer, a thixotropic agent, a dehydrating agent (storage stability improver), a tackifier, a sagging inhibitor, an antioxidant, a flame retardant, a colorant, and a radical polymerization initiator; and various solvents such as toluene and an alcohol in addition to the above-mentioned components as required, or may be blended with any other polymer compatible with the curable composition. In addition, an ultraviolet ray absorbing agent except the component (B), that is, the triazine based ultraviolet ray absorbing agent such as a benzotriazole based, triazine based, benzophenone based, benzoate based, or salicylic acid based ultraviolet ray absorbing agent or a light stabilizer except the component (C), that is, the hindered amine based light stabilizer may be further added to the curable composition of the present invention.

The above other polymer compatible with the curable composition is particularly preferably any one of various polyethers, especially, for example, a polyether having a silicon functional group.

Examples of the adhesion imparting agent include various silane coupling agents such as: aminosilanes including aminoethylaminopropyltrimethoxysilane, aminoethylaminopropylmethyldimethoxysilane, aminoethylaminopropylmethylmethoxysilane; epoxy silanes including γ-glycidoxypropyltrimethoxysilane; acrylsilanes including γ-methacryloxypropyltrimethoxy silane; mercaptosilanes including γ-mercaptopropyltrimethoxy silane; and isocyanate silanes including γ-isocyanate propyltrimethoxysilane. Those adhesion imparting agents may be used alone, or two or more thereof may be used in combination.

The above physical property adjuster is added for the purpose of improving the tensile property of the curable composition. Examples of the above physical property adjuster include silicon compounds each having one silanol group in any one of its molecules, such as triphenylsilanol, trialkylsilanol, dialkylphenylsilanol, and diphenylalkylsilanol. The examples further include various silane coupling agents such as silicon compounds each of which hydrolyzes to produce a compound having one silanol group in any one of its molecules including triphenylmethoxysilane, trialkylmethoxysilane, dialkylphenylmethoxysilane, diphenylalkylmethoxysilane, triphenylethoxysilane, and trialkylethoxysilane. One kind of the above physical property adjusters may be used alone, or two or more kinds of them may be used in combination.

The above filler is added for the purpose of reinforcing a cured product made of the curable composition. Examples of the above filler include calcium carbonate, magnesium carbonate, diatomaceous earth hydrate silicic acid, hydrate silicic acid, silicic acid anhydride, calcium silicate, silica, titanium dioxide, clay, talc, carbon black, slate powder, mica, kaolin, and zeolite. Of those, calcium carbonate is preferable, and calcium carbonate treated with an aliphatic acid is more preferable. In addition, a glass bead, a silica bead, an alumina bead, a carbon bead, a styrene bead, a phenol bead, an acrylic bead, porous silica, a Shirasu balloon, a glass balloon, a silica balloon, a saran balloon, an acrylic balloon, or the like can also be used. Of those, the acrylic balloon is more preferable because a reduction in elongation of the composition after the curing of the composition is small. One kind of the above fillers may be used alone, or two or more kinds of them may be used in combination.

The above plasticizer is added for the purposes of: improving the elongation property of the composition after the curing of the composition; and enabling a reduction in modulus of a cured product. Examples of the plasticizer include: phosphates such as tributyl phosphate and tricresyl phosphate; phthalates such as dioctyl phthalate (DOP), dibutyl phthalate, and butyl benzyl phthalate; aliphatic monobasic acid esters such as glycerin monooleate; aliphatic dibasic acid esters such as dibutyl adipate and dioctyl adipate; glycol esters such as polypropylene glycol; aliphatic esters; epoxy plasticizers; polyester based plasticizers; polyethers; and polystyrenes. One kind of the above plasticizers may be used alone, or two or more kinds of them may be used in combination.

Examples of the above thixotropic agent include: an inorganic thixotropic agent such as colloidal silica or asbestos powder; an organic thixotropic agent such as organic bentonite, modified polyester polyol, or an aliphatic amide; a hydrogenated castor oil derivative; an aliphatic amide wax; aluminum stearate; and barium stearate. One kind of the above thixotropic agents may be used alone, or two or more kinds of them may be used in combination.

The above dehydrating agent is added for the purpose of removing moisture during the storage of the composition. Examples of the dehydrating agent include silane compounds such as vinyltrimethoxysilane, dimethyldimethoxysilane, tetraethoxysilane, methyltrimethoxysilane, and methyltriethoxysilane.

The above antioxidant is used for preventing the oxidation of a cured sealing material to improve the weather resistance of the material, and is, for example, a hindered phenol based antioxidant. Examples of the hindered phenol based antioxidant include, but not limited to, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl[3-(3,5-di-tert-butyl-4-hydroxyphenyl)propionate], N,N'-hexane-1,6-diylbis[3-(3,5-di-tert-butyl-4-hydroxyphenylpropioamide], benzene propionic acid 3,5-bis(1,1-dimethylethyl)-4-hydroxy C7-C9 side chain alkylester, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, a reaction product of N-phenylbenzeneamine and 2,4,4-trimethylpentene, and 2,6-di-tert-butyl-4-(4,6-bis(octylthio)-1,3,5-triazine-2-ylamino) phenol. One kind of the above antioxidants may be used alone, or two or more kinds of them may be used in combination.

The second aspect of the curable composition of the present invention contains the following components (E), (F), (G), and (H) as essential components:

(E) an organic polymer containing a crosslinkable silyl group;

(F) a (meth)acrylic polymer containing an epoxy group;

(G) a divalent tin organic carboxylate; and (H) an organic amine compound.

The organic polymer containing a crosslinkable silyl group exemplified in the description of the component (A) according to the first aspect of the curable composition of the present invention can be similarly used as (E) the organic polymer containing a crosslinkable silyl group.

(F) The (meth)acrylic polymer containing an epoxy group has a weight average molecular weight of preferably 1,000 to 7,500, more preferably 1,500 to 6,000, or still more preferably 2,000 to 5,500. A weight average molecular weight in excess of 7,500 is not preferable because a sufficient plasticizing effect is not exerted, and workability deteriorates. A weight average molecular weight of less than 1,000 is not preferable too because a low-molecular-weight polymer bleeds, and hence the anti-staining property of the composition is reduced. The number of epoxy groups in the polymer (F), which is not particularly limited, is preferably 0.05 or more, or more preferably 0.1 or more on average in one molecule of the polymer. The (meth)acrylic polymer containing an epoxy group functions as a plasticizer and an amine catcher. An epoxy group has polarity, and an increase in polarity of the polymer improves the affinity of the polymer for top coating paint, so adhesiveness between the polymer and the top coating paint may improve.

Although a method of producing (F) the (meth)acrylic polymer containing an epoxy group is not particularly limited, the polymer can be specifically obtained by copolymerizing a (meth)acrylic monomer containing an epoxy group (such as glycidyl(meth)acrylate) or by causing an epoxy group-containing compound to react with a (meth)acrylic polymer containing a functional group. The latter method involving causing an epoxy group-containing compound to react with a (meth)acrylic polymer containing a functional group is, for example, a method involving causing glycidol to react with a polymer having an isocyanate group.

The (meth)acrylic polymer can be produced, but not particularly limited to, by (co)polymerizing one or more kinds of (meth)acrylic monomers such as (meth)acrylic acid, (meth)acrylate, (meth)acrylonitrile, and (meth)acrylamide with a known method. As the (meth)acrylic monomer, (meth)acrylate is particularly preferred.

Examples of the (meth)acrylate include: alkyl(meth)acrylates such as methyl(meth)acrylate, ethyl(meth)acrylate, propyl(meth)acrylate, isopropyl(meth)acrylate, butyl(meth)acrylate, isobutyl(meth)acrylate, s-butyl(meth)acrylate, t-butyl(meth)acrylate, neopentyl(meth)acrylate, 2-ethylhexyl(meth)acrylate, isodecyl(meth)acrylate, lauryl(meth)acrylate, tridecyl(meth)acrylate, and stearyl(meth)acrylate; aliphathic alkyl(meth)acrylates such as cyclohexyl(meth)

acrylate, isobornyl(meth)acrylate, and tricyclodecynyl(meth) acrylate; and hetero atom-containing (meth)acrylates such as 2-methoxyethyl(meth)acrylate, dimethylaminoethyl(meth) acrylate, chloroethyl(meth)acrylate, and trifluoroethyl(meth) acrylate, and tetrahydroflufuryl(meth)acrylate. Of those, methyl methacrylate, ethyl acrylate, butyl(meth)acrylate, 2-ethylhexyl(meth)acrylate, methoxyethyl acrylate, and cyclohexyl acrylate are preferred in regard to obtaining the balance of plasticity. In addition to those (meth)acrylates, any other copolymerizable monomer may be used to such an extent that the physical properties of the composition are not impaired. Examples of such monomer include: α-olefins such as ethylene, propylene, and isobutylene; chloroethylenes such as vinyl chloride and vinylidene chloride; and alkyl vinyl ethers such as ethyl vinyl ether and butyl vinyl ether.

A ratio at which the component (F) is blended is not particularly limited; the component is used in an amount of preferably 5 to 150 parts by mass, more preferably 10 to 120 parts by mass, or still more preferably 15 to 100 parts by mass with respect to 100 parts by mass of the component (E). When the amount is less than 5 parts by mass, a sufficient plasticizing effect or sufficient restoring property cannot be obtained. When the amount exceeds 150 parts by mass, the component bleeds on the surface of the composition, so the anti-staining property of the composition deteriorates in some cases. Only one kind of the (meth)acrylic polymer containing an epoxy group may be used, or two or more kinds of such polymers may be used in combination.

Examples of (G) the divalent tin organic carboxylate include tin(II) octylate, tin(II) naphthenate, and tin(II) stearate. A ratio at which the component (G) is blended is not particularly limited; the component is blended in an amount of preferably 0.001 to 10 parts by mass with respect to 100 parts by mass of the component (E). Only one kind of the divalent tin organic carboxylate may be used, or two or more kinds of such salts may be used as a mixture.

Examples of the organic amine compound (H) include diethylenetriamine, triethyelenetetramine, tetraethylenepentamine, butylamine, hexylamine, octylamine, decylamine, laurylamine, hexamethylenediamine, triethanolamine, dibutylamine, diethanolamine, N,N,N',N'-tetramethyl-1,3-butanediamine, benzylamine, cyclohexylamine, dodecamethylenediamine, diemethylethylenediamine, dimethylaminoethanol, N,N,N',N'-tetramethylethylenediamine, triethylamine, N,N-dimethylaniline, and diemethylbenzylaniline. In addition, a compound that reacts with water to produce an organic amine such as ketimine can also be used as the organic amine compound.

A ratio at which the above component (H) is blended is not particularly limited; the component is blended in an amount of preferably about 0.001 to 10 parts by mass with respect to 100 parts by mass of the component (E). One kind of the above organic amine compound may be used alone, or two or more kinds of such compounds may be used in combination.

In the second aspect of the curable composition of the present invention, the curable composition may be blended with any one of: various other additives such as a curing catalyst, an adhesion imparting agent, a physical property adjuster, a filler, a plasticizer, a thixotropic agent, a dehydrating agent (storage stability improver), a tackifier, a sagging inhibitor, an ultraviolet ray absorbing agent, an antioxidant, a flame retardant, a colorant, and a radical polymerization initiator; and various solvents such as toluene and an alcohol in addition to the above-mentioned components as required.

The third aspect of the curable composition of the present invention contains the following components (I), (J), and (K) as essential components:

(I) a reactive organic polymer containing at least one crosslinkable silyl group in any one of its molecules;
(J) a reactive organic polymer containing less than one crosslinkable silyl group in any one of its molecules; and
(K) thermally expandable hollow spheres as essential components.

The above thermally expandable hollow spheres are microcapsules each made of a thermoplastic resin and each including a volatile expansive additive that is brought into a gas state at a temperature equal to or lower than the softening point of the resin. In other words, the thermally expandable hollow spheres are the following substances: a volatile substance in each of the substances expands by virtue of heating, and, at the same time, a resin composition as the outer shell of each of the substances softens, whereby the volume of each of the substances expands to be many times as large as that in an initial state. A hydrocarbon based liquid having a low boiling point has been conventionally used as the volatile expansive additive, and it has not been acknowledged that the thermally expandable hollow spheres are each a substance having high combustibility and imparting flame resistance. The inventors of the present invention have found that a curable composition having excellent fire resistance while maintaining good physical properties and safety can be obtained at a low cost by incorporating the thermally expandable hollow spheres (K) in an amount of 0.01 part by mass or more to less than 20 parts by mass, preferably 0.01 part by mass or more to less than 15 parts by mass, or more preferably 0.03 part by mass or more to 10 parts by mass or less with respect to a total of 100 parts by mass of the reactive organic polymer containing at least one crosslinkable silyl group in any one of its molecules (I) and the reactive organic polymer containing less than one crosslinkable silyl group in any one of its molecules (J). An additional amount of the thermally expandable hollow spheres (K) of 20 parts by mass or more is not desirable because the physical properties of the curable composition are reduced, and a foaming heat insulating layer to be formed when the composition is exposed to flame becomes so huge that the fire resistance of the composition is reduced.

In the curable composition of the present invention, the hardness of a rubber-like elastic body after the curing of the composition (rubber hardness meter: JIS A type) is preferably 40 or less, or more preferably 35 or less.

Hereinafter, the reactive organic polymer containing at least one crosslinkable silyl group in any one of its molecules (I) to be used in the present invention will be described. A reactive organic polymer containing at least one crosslinkable silyl group in any one of its molecules is used as the polymer (I). An organic polymer containing at least one crosslinkable silyl group in any one of its molecules out of the organic polymers each containing a crosslinkable silyl group exemplified in the description of the component (A) according to the first aspect of the curable composition of the present invention can be similarly used as the organic polymer containing a crosslinkable silyl group (I).

Next, the reactive organic polymer containing less than one crosslinkable silyl group in any one of its molecules (J) to be used in the present invention will be described. An organic polymer containing zero or more and less than one crosslinkable silyl group in any one of its molecules is used as the polymer (J). The crosslinkable silyl group is preferably one represented by the general formula (1). Specific suitable examples of the polymer include a polyoxyalkylene based polymer, a vinyl-modified polyoxyalkylene based polymer, a vinyl based polymer, a polyester polymer, and a (meth)acrylate polymer each of which contains zero or more and less than one crosslinkable silyl group on average in any one of its molecules and the main chain of each of which may contain organosiloxane, and a copolymer or mixture of two or more of them. In particular, in terms of physical properties such as tensile strength and a modulus after the curing of the composition, a polyoxyalkylene based polymer, a (meth)acrylic polymer, and a (meth)acrylic-modified polyoxypropylene polymer each of which contains less than one, or preferably less than 0.7 crosslinkable silyl group on average in any one of its molecules and the main chain of each of which may contain organosiloxane, and a copolymer or mixture of two or more of them are preferable, and such (meth)acrylic polymer is more preferable.

A method of producing the polymer (J) is not particularly limited, and the polymer can be produced by, for example, setting the number of crosslinkable silyl groups present in one molecule of an organic polymer containing a crosslinkable silyl group to less than one in the method of producing the organic polymer described in the description of the polymer (A). A method of producing the polymer (J) is specifically, for example, a production method employed in Synthesis Example 4 to be described later.

In the present invention, the above reactive organic polymer (J) desirably has a weight average molecular weight of 2,000 or more to 50,000 or less, or preferably 2,000 or more to 30,000 or less and a narrow molecular weight distribution because the viscosity of the polymer before the curing of the composition is so low that the polymer can be easily handled, and the physical properties of the composition after the curing of the composition such as strength, an elongation rate, and a modulus are suitable. Only one kind of the above polymer (J) may be used, or two or more kinds of such polymers may be used in combination.

A ratio at which the polymer (J) is blended is not particularly limited; the polymer (J) is used in an amount of preferably 10 to 300 parts by mass, or more preferably 20 to 200 parts by mass with respect to 100 parts by mass of the polymer (I).

Hereinafter, the thermally expandable hollow spheres (K) to be used in the present invention will be described. Examples of the thermally expandable hollow spheres (K) include those disclosed in JP 42-26524B, JP49-14381B, JP63-122713A, JP63-122745A, JP4-08534 A, JP56-113338A, JP11-209504A, JP 2000-191817A, JP 2002-12693A, JP 2002-363537A, and U.S. Pat. No. 4,722,943. To be specific, spheres each containing a foaming agent in a shell part composed of, for example, polyvinylidene chloride, a copolymer of vinylidene chloride and acrylonitrile, polyacrylonitrile, or a copolymer of acrylonitrile and methyl acrylate and each having a particle diameter of about 1 to 50 μm like a "Microsphere" manufactured by Matsumoto Yushi-Seiyaku Co., Ltd are used. Examples of the foaming agent include: low-boiling-point hydrocarbons such as ethane, propane, butane, pentane, hexane, heptane, and cyclopentane; halogenated hydrocarbons such as methyl chloride and ethyl chloride; HCFCs such as 1,1-dichloro-1-fluoroethane; and HFCs such as 1,1,1,2-tetrafluoroethane. Only one kind of the above hollow spheres (K) may be used, or two or more kinds of the spheres may be used in combination.

In addition, any other foaming agent may be added to the composition according to the third aspect of the curable composition of the present invention. The kind of the foaming agent is not particularly limited, and an ordinary agent can be used. In addition, multiple agents may be combined. Ammonium polyphosphate is particularly desirably used as the other foaming agent; the generation of an ammonia gas caused by the hydrolysis of ammonium polyphosphate and phosphorus in ammonium polyphosphate promote the carbonization of any other substance to cause the substance to produce an incombustible carbonized layer, whereby ammonium polyphosphate has an action of improving the fire resistance of the composition. In addition, ammonium polyphosphate described above has poor water resistance, so coated ammonium polyphosphate with improved water resistance is more desirable.

In addition, in the third aspect of the curable composition of the present invention, any one of: various additives such as a flame retardant, a plasticizer, a filler, a curing catalyst, an adhesion imparting agent, a physical property adjuster, a thixotropic agent, a dehydrating agent (storage stability improver), a tackifier, a sagging inhibitor, an ultraviolet ray absorbing agent, an antioxidant, a flame retardant, a colorant, and a radical polymerization initiator; and various solvents such as toluene and an alcohol may be added to the curable composition as required. Those additives are not particularly limited, and an ordinary additive can be used. In addition, multiple additives may be combined.

The curable composition of the present invention can be turned into a one-component liquid or a two-component liquid as required. The curable composition of the present invention, which is most suitably used in a sealing material, can be used in, for example, an adhesive, a pressure-sensitive adhesive, a coating material, or a potting material as required. The curable composition of the present invention can be used for, for example, various structures, automobiles, civil engineering, and electrical and electronic fields.

A fire-resistant structure capable of passing a fire resistance test described in JIS A 1304 can be formed with ease at a low cost by the combined use of a sealing material having fire resistance and using the third aspect of the curable composition of the present invention as an available ingredient and a wall material having fire resistance.

Figure 2:
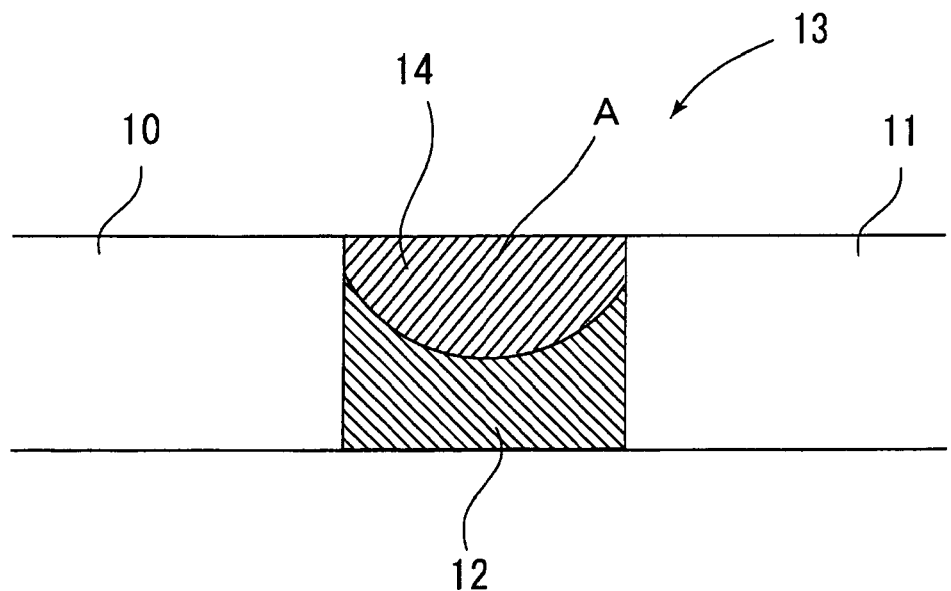
FIG. 2 is a top view of FIG. 1.

The formation method of the present invention involves forming a fire-resistant structure by using a wall material having fire resistance and the sealing material having fire resistance of the present invention. FIG. 1 is a perspective view showing an example of a fire-resistant structure to be formed by the formation method of the present invention. FIG. 2 is a top view of FIG. 1. In FIGS. 1 and 2, a wall material 10 having fire resistance and a wall material 11 having fire resistance are brought into abutment with each other through a filler 14 such as a back-up material or a bond breaker provided for an abutting portion A, and the abutting portion A is filled with a sealing material 12 of the present invention, whereby a fire-resistant structure 13 is formed.

Examples of the above wall material 10 having fire resistance include precast concrete (PC), an autoclaved lightweight aerated concrete panel (ALC), and a ceramic covering material for a fire-resistant structure. The above filler 14 such as a back-up material or a bond breaker is not particularly limited, and a wide variety of known fillers can be used; a fire-resistant filler such as the "Litoflex" manufactured by NICHIAS Corporation is more preferably used because the fire resistance of the fire-resistant structure is additionally improved.

The fire-resistant structure to be obtained by the present invention can form a foaming heat insulating layer when exposed to flame to shield, for example, heat, flame, smoke, and a gas generated by combustion. In addition, according to the present invention, there can be provided a structure having extremely excellent fire resistance not only when a special back-up material having fire resistance is used but also when an ordinary back-up material (such as a product extruded or cut out from polyethylene) is used.

EXAMPLES

Hereinafter, the present invention will be described more specifically by way of examples. Needless to say, however, these examples are exemplary, and should not be construed as being limitative.

Examples 1 to 12 and Comparative Examples 1 to 4

Synthesis Example 1

Synthesis of Ketimine Compound 500 g of a primary amine dissolved by heating (stearylamine; trade name "FIRMIN 80" manufactured by KAO CORPORATION, amine value 207) were loaded into a stirring vessel provided with a heating device and an ester tube. After that, 203 g of a carbonyl compound (methyl isobutyl ketone, molecular weight: 100.2) were added to the vessel while the amine was stirred. 130 g of toluene were further added to the mixture. Then, the resultant was heated to 110 to 150° C., continuously stirred for 3 hours, and dehydrated from the ester tube. Next, excessive amounts of the carbonyl compound and toluene were removed under reduced pressure, whereby a ketimine compound was obtained.

Synthesis Example 2

Synthesis of Acrylic Polymer 1 Containing Crosslinkable Silyl Group

The temperature of a pressure stirring tank type reactor provided with an electrothermal heater and having a volume of 1,000 ml was kept at 200° C. Next, while the pressure in the reactor was kept constant, a monomer mixture composed of 84 parts of butyl acrylate as an acrylate monomer, 16 parts of γ-methacryloxypropyltrimethoxysilane as a hydrolyzable silyl group-containing monomer, and 1 part of di-t-butyl peroxide as a polymerization initiator started to be continuously supplied from a raw material tank to the reactor at a constant supply speed (80 g/min, residence time: 12 minutes), and a reaction liquid corresponding to the supplied amount of the monomer mixture was continuously pulled out from the outlet of the reactor.

Immediately after the initiation of the reaction, the reaction temperature reduced once, and then an increase in temperature due to heat of polymerization was observed. The reaction temperature was kept at 250 to 251° C. by controlling the heater. The time point when the temperature became stable after the initiation of the supply of the monomer mixture was defined as the starting point of the collection of the reaction liquid. The reaction was continued for 25 minutes from the starting point, whereby 2 kg of the monomer mixed liquid were supplied, and 1.9 kg of the reaction liquid were recovered. After that, the reaction liquid was introduced to a thin-film evaporator, and volatile components such as an unreacted monomer were separated, whereby a condensed liquid was obtained. Gas chromatographic analysis confirmed that no unreacted monomer was present in the condensed liquid. The resultant polymer had a number average molecular weight of 2,000 in terms of polystyrene measured by gel permeation chromatography using tetrahydrofuran as a solvent and a weight average molecular weight of 4,800 in terms of polystyrene similarly measured. In addition, the number of crosslinkable silyl groups per one molecule of the polymer was 1.29. An acrylic polymer 1 having 1.29 crosslinkable silyl groups on average in any one of its molecules was obtained.

Example 1

As shown in Table 1, predetermined amounts of a modified silicone polymer SA 100S (manufactured by Kaneka Corporation) as the component (A), that is, the organic polymer containing a crosslinkable silyl group, a 1577 FF (manufactured by Ciba Specialty Chemicals) as the component (B), that is, the triazine based ultraviolet ray absorbing agent, a CHIMASSORB 119FL (manufactured by Ciba Specialty Chemicals) as the component (C), that is, the light stabilizer, a plasticizer, a filler, and a dehydration treatment agent were loaded, and the blended substances were mixed and stirred under heat and reduced pressure at 110° C. for 2 hours, whereby the blended substances were dehydrated. Further, predetermined amounts of the ketimine compound obtained in Synthesis Example 1 as the component (D), dibutyltin diacetylacetonate as a curing catalyst, and an aminosilane compound as a silane coupling agent were added to and blended in the resultant under stirring, whereby a curing composition was prepared.

TABLE 1

| Component | Blended substances | Example No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| (A) | Acrylic polymer containing crosslinkable silyl group at terminal *1 | 100 | 50 | 100 | 100 | 100 | 100 | 100 | 100 | 100 | — | — | — |
| | Acrylic polymer containing crosslinkable silyl group *2 | — | — | — | — | — | — | — | — | — | 100 | — | — |
| | Acrylic-modified polyoxyalkylene polymer containing crosslinkable silyl group *3 | — | — | — | — | — | — | — | — | — | — | 100 | — |
| | Polyoxyalkylene polymer containing crosslinkable silyl group *4 | — | 50 | — | — | — | — | — | — | — | — | — | 100 |
| (B) | Triazine based ultraviolet ray absorbing agent *5 | 1 | 1 | 1 | 1 | 1 | 1 | 1 | 1 | 1 | 1 | 1 | 1 |
| (C) | Hindered amine based compound containing triazine skeleton *6 | 1 | 1 | 1 | — | — | — | 0.5 | — | — | 1 | 1 | 1 |
| | Hindered amine based compound containing triazine skeleton *7 | — | — | — | — | 1 | — | — | — | — | — | — | — |

TABLE 1-continued

| | | Example No. | | | | | | | | | | | |
|---|---|---|---|---|---|---|---|---|---|---|---|---|---|
| Component | Blended substances | 1 | 2 | 3 | 4 | 5 | 6 | 7 | 8 | 9 | 10 | 11 | 12 |
| | Hindered amine based compound containing triazine skeleton *8 | — | — | — | — | — | 1 | — | — | — | — | — | — |
| | Hindered amine based compound *9 | — | — | — | 1 | — | — | 0.5 | — | — | — | — | — |
| | Hindered amine based compound *10 | — | — | — | — | — | — | — | 1 | 1 | — | — | — |
| (D) | Ketimine compound *11 | 3 | 3 | — | — | — | — | — | — | — | — | — | — |
| | Antioxidant *12 | — | — | — | — | — | — | — | — | 1 | — | — | — |
| | Plasticizer *13 | 60 | 60 | 60 | 60 | 60 | 60 | 60 | 60 | 60 | 60 | 60 | 60 |
| | Filler *14 | 140 | 140 | 140 | 140 | 140 | 140 | 140 | 140 | 140 | 140 | 140 | 140 |
| | Dehydration treatment agent *15 | 1 | 1 | 1 | 1 | 1 | 1 | 1 | 1 | 1 | 1 | 1 | 1 |
| | Silane coupling agent *16 | 2 | 2 | 2 | 2 | 2 | 2 | 2 | 2 | 2 | 2 | 2 | 2 |
| | Curing catalyst *17 | 2 | 2 | 2 | 2 | 2 | 2 | 2 | 2 | 2 | 2 | 2 | 2 |

The amounts of the blended substances in Table 1 are each represented by "part(s) by mass", and the symbols *1 to *17 represent the following products:
*1: an acrylic polymer containing a crosslinkable silyl group at a terminal of any one of its molecules synthesized by a living radical polymerization method (trade name; SA 100S, manufactured by Kaneka Corporation);
*2: the acrylic polymer 1 containing a crosslinkable silyl group obtained in Synthesis Example 2;
*3: an acrylic-modified polyoxyalkylene polymer containing a crosslinkable silyl group (trade name; S911, manufactured by Kaneka Corporation);
*4: a polyoxyalkylene polymer containing a crosslinkable silyl group (trade name; S203, manufactured by Kaneka Corporation);
*5: a triazine based ultraviolet ray absorbing agent (trade name; 1577FF, manufactured by Ciba Specialty Chemicals);
*6: a hindered amine based compound having a triazine skeleton (trade name; CHIMASSORB 119FL, manufactured by Ciba Specialty Chemicals);
*7: a hindered amine based compound having a triazine skeleton (trade name; CHIMASSORB 2020FL, manufactured by Ciba Specialty Chemicals);
*8: a hindered amine based compound having a triazine skeleton (trade name; CHIMASSORB 944FD, manufactured by Ciba Specialty Chemicals);
*9: a hindered amine based compound free of a triazine skeleton (containing a —NCH$_3$ group, trade name; LA62, manufactured by Ashahi Denka Co., Ltd);
*10: a hindered amine based compound free of a triazine skeleton (containing a —NOR group, trade name; TINUVIN 123, manufactured by Ciba Specialty Chemicals);
*11: the ketimine compound obtained in Synthesis Example 1;
*12: an antioxidant (trade name; AO-20, manufactured by Ashahi Denka Co., Ltd);
*13: an acrylic polymer (trade name; UP1000, manufactured by TOAGOSEI CO., LTD.);
*14: calcium carbonate (trade name; CCR, manufactured by Shiraishi Kogyo Kaisha, Ltd.);
*15: a moisture absorbent (trade name; KBM1003, manufactured by Shin-Etsu Chemical Co., Ltd.);
*16: an aminosilane compound (trade name; KBM603, manufactured by Shin-Etsu Chemical Co., Ltd.); and
*17: dibutyltin diacetylacetonate (trade name; NEOSTAN U220, manufactured by NITTO KASEI CO., LTD.).

Examples 2 to 12 and Comparative Examples 1 to 4

Curable compositions were each prepared in the same manner as in Example 1 except that the blended substances and a ratio at which each of the substances was blended were changed as shown in each of Tables 1 and 2.

TABLE 2

| | | Comparative Example No. | | | |
|---|---|---|---|---|---|
| Component | Blended substances | 1 | 2 | 3 | 4 |
| (A) | Acrylic polymer containing crosslinkable silyl group at terminal *1 | 100 | — | — | — |
| | Acrylic polymer containing crosslinkable silyl group *2 | — | 100 | — | — |
| | Acrylic-modified polyoxyalkylene polymer containing crosslinkable silyl group *3 | — | — | 100 | — |
| | Polyoxyalkylene polymer containing crosslinkable silyl group *4 | — | — | — | 100 |
| | Ultraviolet ray absorbing agent *18 | 1 | 1 | 1 | 1 |
| (C) | Hindered amine based compound *9 | 1 | 1 | 1 | 1 |
| | Plasticizer *13 | 60 | 60 | 60 | 60 |
| | Filler *14 | 140 | 140 | 140 | 140 |
| | Dehydration treatment agent *15 | 1 | 1 | 1 | 1 |
| | Silane coupling agent *16 | 2 | 2 | 2 | 2 |
| | Curing catalyst *17 | 2 | 2 | 2 | 2 |

The amounts of the blended substances in Table 2 are each represented by "part(s) by mass", the symbols *1 to 4, 9, and 13 to 17 each have the same meaning as that of Table 1, and the symbol *18 represents the following product:
*18: a benzotriazole based ultraviolet ray absorbing agent (trade name; LA36, manufactured by Ashahi Denka Co., Ltd).

Each of the above resultant curable compositions was subjected to the following performance tests. Tables 3 and 4 show the results.

(1) Weather Resistance Test

Each of the above curable compositions was molded into a sheet having a thickness of 5 mm, and the sheet was aged at 23° C. for 7 days and subsequently at 30° C. for 7 days, whereby the thick layer portion of a cured product sheet was obtained. In addition, each of the above curable compositions was molded into a sheet having a thickness of 0.2 mm by using a metal spacer as a sheet having a thickness of 0.2 mm, and the resultant sheet was aged at 23° C. for 7 days and subsequently at 30° C. for 7 days, whereby the thin layer portion of the cured product sheet was obtained. Each of the resultant thick layer portion and the resultant thin layer portion was irradiated with light from a Daipla Metal Weather (manufactured by Daipla Wintes Co., Ltd., model KU-R4-A), and the deterioration of the surface of each of the layers with time was visually observed.

Evaluation Criteria of Weather Resistance Test

The thin layer portion was evaluated for time period needed complete whitening.

x: less than 200 hours, Δ: 200 hours or more and less than 500 hours, ○: 500 hours or more and less than 1,000 hours, ⊚: 1,000 hours or more.

The thick layer portion was evaluated for time period needed for the generation of a crack.

x: less than 500 hours, Δ: 500 hours or more and less than 800 hours, ○: 800 hours or more and less than 1,200 hours, ⊚: 1,200 hours or more.

(2) Anti-Staining Property Test

Each of the above curable compositions was molded into a sheet having a thickness of 10 mm. The sheet was exposed to the outdoors in the south direction at an angle of 45° for 6 months, and the presence or absence of staining on the surface of the sheet was visually observed. The case where the staining was severe was denoted by x, the case where nearly no staining was present was denoted by ○, and the case where no staining was present was denoted by ⊚.

(3) Elongation Rate Test

An abutting test body having a joint length of 50 mm, a joint width of 12 mm, and a joint depth of 12 mm was produced by using each of the resultant curable compositions and a ceramic siding material (trade name "MOEN M" manufactured by NICHIHA CORPORATION). It should be noted that the body was aged under standard conditions of 23° C. and 50% RH for 14 days. The produced test body was subjected to a tensile strength test at a tension speed of 50 mm/min, and its maximum elongation rate was measured.

TABLE 3

| | | Example No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Weather resistance | Thin layer portion | ⊚ | ⊚ | ⊚ | ⊚ | ⊚ | ⊚ | ⊚ | ⊚ | ⊚ | ⊚ | ○ | ○ |
| | Thick layer portion | ⊚ | ⊚ | ⊚ | ⊚ | ⊚ | ⊚ | ⊚ | ⊚ | ⊚ | ⊚ | ⊚ | ○ |
| Anti-staining property | | ⊚ | ⊚ | X | X | X | X | X | X | X | X | X | X |
| Elongation rate [%] | | 450 | 650 | 400 | 400 | 400 | 400 | 400 | 400 | 400 | 150 | 500 | 600 |

TABLE 4

| | | Comparative Example No. | | | |
|---|---|---|---|---|---|
| | | 1 | 2 | 3 | 4 |
| Weather resistance | Thin layer portion | Δ | Δ | x | x |
| | Thick layer portion | ○ | ○ | Δ | x |
| Anti-staining property | | x | x | x | x |
| Elongation rate [%] | | 400 | 150 | 500 | 600 |

As shown in Tables 3 and 4, each of the curable compositions of Examples 1 to 12 showed excellent weather resistance in not only a thick layer portion but also a thin layer portion. In addition, each of the curable compositions of Examples 1 and 2 to each of which the ketimine compound had been added showed significantly improved anti-staining property. Further, each of the curable compositions of Examples 1 to 9 each using a (meth)acrylic polymer having a crosslinkable silyl group at a terminal of any one of its molecules as the component (A) showed extremely good weather resistance and a high elongation rate particularly useful in a sealing material.

Examples 13 to 17 and Comparative Examples 5 to 8

Synthesis Example 3

Synthesis of Acrylic Polymer Containing Crosslinkable Silyl Group 85 parts by weight of n-butyl acrylate, 15 parts by weight of methyl methacrylate, 10 parts by weight of γ-methacryloxypropyltrimethoxysilane, and 0.1 part by weight of titanocene dichloride as a metal catalyst were loaded into a flask provided with a stirring device, a nitrogen gas-introducing tube, a temperature gauge, and a reflux condenser, and the contents in the flask were heated to 70° C. while a nitrogen gas was introduced into the flask.

Next, 1.5 parts by weight of 3-mercaptopropyltrimethoxysilane were added in one stroke to the flask the inside of which had been sufficiently replaced with a nitrogen gas while the contents in the flask were stirred. After the addition of 1.5 parts by weight of 3-mercaptopropyltrimethoxysilane, heating and cooling were performed for 4 hours in order that the temperature of the contents in the flask during the stirring might be kept at 70° C. Further, heating was performed in order that the temperature of the contents in the flask during the stirring might be kept at 90° C., and a polymerization reaction was continued for 2 hours. After that, 0.1 part by weight of azobisisobutyronitrile as a radical polymerization initiator was added to the flask, and the polymerization was continued for an additional 1 hour, whereby the amount of a remaining monomer was reduced.

After the above-mentioned reaction for a total of 7 hours, the temperature of the reaction product was returned to room temperature, and the polymerization was terminated. An acrylic polymer containing a crosslinkable silyl group, the polymer having a rate of polymerization of 98.7%, Mw of 34,000, Mn of 18,000, a dispersion index of 1.9, and a silylation rate of 1.1, was obtained.

Example 13

As shown in Table 5, predetermined amounts of a modified silicone polymer SA 100S (manufactured by Kaneka Corporation: trade name "SA 100S") as the component (E), that is, the organic polymer containing a crosslinkable silyl group, an XG-4010 (manufactured by TOAGOSEI CO., LTD.) as the component (F), that is, the (meth)acrylic polymer containing an epoxy group, ground calcium carbonate, surface-treated calcium carbonate, an antioxidant, a NEOSTAN U-28 (manufactured by NITTO KASEI CO., LTD.) as the component (G), that is, the divalent tin organic carboxylate, and a FIRMIN 20D (manufactured by KAO CORPORATION) as the component (H), that is, the organic amine compound were loaded, whereby a curing composition was prepared.

TABLE 5

| Component | Blended substances | Example No. 13 | 14 | 15 | 16 | 17 | Comparative Example No. 5 | 6 | 7 | 8 |
|---|---|---|---|---|---|---|---|---|---|---|
| (E) | Acrylic polymer containing crosslinkable silyl group at terminal *21 | 100 | 50 | — | — | — | — | — | — | — |
| | Acrylic polymer containing crosslinkable silyl group *22 | — | — | 100 | — | — | — | — | — | — |
| | Polyoxyalkylene polymer containing crosslinkable silyl group *23 | — | 50 | — | 100 | — | 100 | 100 | 100 | 100 |
| | Acrylic-modified polyoxyalkylene polymer containing crosslinkable silyl group *24 | — | — | — | — | 100 | — | — | — | — |
| (F) | Acrylic polymer containing glycidyl group *25 | 60 | 60 | 60 | 60 | 60 | — | — | — | 60 |
| | Epoxy based plasticizer *26 | — | — | — | — | — | 60 | — | — | — |
| | Phthalic acid based plasticizer *27 | — | — | — | — | — | — | 60 | — | — |
| | Acrylic polymer *28 | — | — | — | — | — | — | — | 60 | — |
| (G) | Stannous compound *29 | 4 | 4 | 4 | 4 | 4 | 4 | 4 | 4 | — |
| | Stannic compound *30 | — | — | — | — | — | — | — | — | 4 |
| (H) | Organic amine compound *31 | 1 | 1 | 1 | 1 | 1 | 1 | 1 | 1 | 1 |
| | Ground calcium carbonate *32 | 75 | 75 | 75 | 75 | 75 | 75 | 75 | 75 | 75 |
| | Surface-treated calcium carbonate *33 | 135 | 135 | 135 | 135 | 135 | 135 | 135 | 135 | 135 |
| | Antioxidant *34 | 3 | 3 | 3 | 3 | 3 | 3 | 3 | 3 | 3 |

The amounts of the blended substances in Table 5 are each represented by "part(s) by mass", and the symbols *21 to *34 represent the following products:
*21: an acrylic polymer having a crosslinkable silyl group at a terminal of any one of its molecules produced by living radical polymerization (manufactured by Kaneka Corporation: trade name "SA 100S");
*22: the acrylic polymer containing a crosslinkable silyl group obtained in Synthesis Example 3;
*23: a polyoxyalkylene polymer containing a crosslinkable silyl group (manufactured by Kaneka Corporation: trade name "S-810");
*24: an acrylic-modified polyoxyalkylene polymer containing a crosslinkable silyl group (manufactured by Kaneka Corporation: trade name "S-911");
*25: an acrylic polymer containing a glycidyl group (manufactured by TOAGOSEI CO., LTD.: trade name "XG-4010", average number of epoxy groups in one molecule 1.4);
*26: an epoxy based plasticizer (manufactured by New Japan Chemical Co., ltd.: trade name "SANSOCIZER E-145 or EPS", molecular weight 410);
*27: a phthalic acid based plasticizer (DINP)
*28: an acrylic polymer (no functional group, manufactured by TOAGOSEI CO., LTD.: trade name "UP-1000");
*29: stannous octoate as a stannous compound (manufactured by NITTO KASEI CO., LTD.: trade name "NEOSTAN U-28");
*30: dibutyltin laurate as a stannic compound (manufactured by NITTO KASEI CO., LTD.: trade name "NEOSTAN U-100");
*31: laurylamine (manufactured by KAO CORPORATION: trade name "FIRMIN 20D");
*32: ground calcium carbonate (manufactured by BIHOKU FUNKA KOGYO CO., LTD.: trade name "WHITON SB");
*33: surface-treated calcium carbonate (manufactured by MARUO CALCIUM CO., LTD.: trade name "CALFINE 200"); and
*34: an antioxidant (manufactured by Ciba Specialty Chemicals: trade name "TINUVIN B-75").

Examples 14 to 17 and Comparative Examples 5 to 8

Curable compositions were each prepared in the same manner as in Example 13 except that the blended substances and a ratio at which each of the substances was blended were changed as shown in each of Table 5.

Each of the above resultant curable compositions was subjected to the following measurement. Table 6 shows the results.

(1) Restoring Property

An H-shaped test body in accordance with JIS A 1439 was produced, and was aged under an environment of 23° C. and 50% RH for 7 days, an environment of 50° C. for 7 days, and an environment of 90° C. for 14 days. After that, the body was left at rest under an environment of 23° C. and 50% RH for 24 hours. The thickness at that time (about 12.00 mm) was defined as an initial thickness. Next, the body was left at rest under an environment of 23° C. and 50% RH for 24 hours while being elongated so as to be twice as thick as the initial thickness (about 24.00 mm) with a predetermined jig. 24 hours after that, the jig was released, and the body was left at rest for 1 hour. After that, the thickness was measured, and restoring property was obtained by using the following equation.

Restoring property(%)=(thickness after elongation−thickness after release)/initial thickness×100

(2) Durability Test

A durability test (durability category 9030) was performed in accordance with JIS A 1439 (1997) 4. 17. In the durability test, a passing result was denoted by ○, and an unsatisfactory result was denoted by x.

(3) Paint Anti-Staining Property

Conditions for aging of sealing material: under conditions of 23° C. and 50% RH for 7 days Conditions for aging of paint: under conditions of 23° C. and 50% RH for 7 days Evaluation method: the heating of the sealing material was promoted in a dryer at 50° C. for 7 days. After that, black silica sand was sprinkled on the paint, and the presence or absence of staining was visually observed on the basis of the extent to which the sand adhered to the paint. All paints were evaluated as follows: the case where no staining was observed was denoted by ○, and the case where staining was observed in any one of the paints was denoted by x.

Various paints used in the paint anti-staining property test were as shown below.

Paints; Buildec: solvent based acryl, manufactured by DAI NIPPON TORYO CO., LTD.
Vinylose: solvent based vinyl chloride, manufactured by DAI NIPPON TORYO CO., LTD.
Beauron: aqueous acryl, manufactured by DAI NIPPON TORYO CO., LTD.
Odecoat G: aqueous acryl, manufactured by Nippon Paint Co., Ltd.
DAN UNI: aqueous acryl, manufactured by Nippon Paint Co., Ltd.
New Topless Clean: aqueous acrylic silicone, manufactured by SK KAKEN Co., Ltd.
Pleasecoat: aqueous acryl, manufactured by SK KAKEN Co., Ltd.
Tilelac U: urethane based, manufactured by Nippon Paint Co., Ltd.
New Softlithin: aqueous acryl, manufactured by SK KAKEN Co., Ltd.

(4) Weather Resistance

A weather resistance test was performed in a sunshine weatherometer, and the external appearance of each of the curable compositions was investigated 1,000 hours, 2,000 hours, 3,000 hours, and 4,000 hours after the initiation of the test. In the results of the weather resistance test, the symbol ○ means that no crack is present, the symbol Δ means that a small number of cracks are present, and the symbol x means that a large number of cracks are present.

(5) Elongation Rate Test

Each of the resultant curable compositions was subjected to an elongation rate test in the same manner as in Example 1, and its maximum elongation rate was measured.

TABLE 6

|  | Example No. | | | | | Comparative Example No. | | | |
| --- | --- | --- | --- | --- | --- | --- | --- | --- | --- |
|  | 13 | 14 | 15 | 16 | 17 | 5 | 6 | 7 | 8 |
| Restoring property (%) | 99.55 | 97.56 | 98.33 | 96.67 | 96.67 | 95.00 | 83.62 | 81.36 | 73.85 |
| Durability | ○ | ○ | ○ | ○ | ○ | ○ | x | x | x |
| Paint anti-staining property | ○ | ○ | ○ | ○ | ○ | x | x | ○ | ○ |
| Weather resistance test | | | | | | | | | |
| After 1,000 hours | ○ | ○ | ○ | ○ | ○ | Δ | Δ | ○ | ○ |
| After 2,000 hours | ○ | ○ | ○ | ○ | ○ | x | x | ○ | ○ |
| After 3,000 hours | ○ | ○ | ○ | ○ | ○ | x | x | ○ | ○ |
| After 4,000 hours | ○ | ○ | ○ | x | Δ | x | x | ○ | ○ |
| Elongation rate [%] | 400 | 600 | 140 | 600 | 500 | 600 | 630 | 600 | 650 |

As shown in Table 6, each of the curable compositions of Examples 13 to 17 was excellent in weather resistance, paint anti-staining property, and durability, and had extremely good restoring property; each of the compositions had a restoring property of 95% or more. In particular, each of the curable compositions of Examples 13 and 14 each using a (meth)acrylic polymer having a crosslinkable silyl group at a terminal of any one of its molecules as the component (E) was excellent in restoring property, durability, and paint anti-staining property, had extremely high weather resistance, and showed an excellent elongation rate. On the other hand, each of the curable compositions of Comparative Examples 5 and 6 was poor in paint anti-staining property and weather resistance. In addition, each of the curable compositions of Comparative Examples 6 to 8 was poor in restoring property, and failed in the durability test.

Examples 18 to 30 and Comparative Examples 9 to 17

Synthesis Example 4

Synthesis of Acrylic Polymer Having Less than One Crosslinkable Silyl Group in any One of its Molecules 200 g of 2-propanol were charged into a 2 L pressure-resistant autoclave provided with a stirring machine. Next, air in the autoclave was repeatedly subjected to an operation consisting of deaeration and replacement with nitrogen three times. After that, the air in the autoclave was deaerated under reduced pressure, and the autoclave was heated to 240° C. At the time of the completion of the temperature increase, a mixed liquid composed of 670 g of butyl acrylate, 300 g of 2-ethylhexyl acrylate, 30 g of γ-methacryloxypropyltrimethoxysilane, 200 g of 2-propanol, and 10 g of di-t-butyl peroxide was supplied into the autoclave at a constant speed, and a reaction was initiated. The addition and the reaction were performed over 2 hours, and, 10 minutes after the completion of the addition, the mixture was cooled to 30° C., whereby 1,350 g of a polymerization liquid were obtained. The resultant polymerization liquid was condensed under reduced pressure, whereby the solvent was removed. An acrylic polymer containing a crosslinkable silyl group, the polymer having Mw of 1,800, Mn of 4,400, and a silylation rate of 0.22, was obtained.

Example 18

As shown in Table 7, predetermined amounts of the organic polymer containing at least one crosslinkable silyl group in any one of its molecules (I), the organic polymer containing less than one crosslinkable silyl group in any one of its molecules (J), an antioxidant, calcium carbonate, and a dehydrating agent were loaded, and the blended substances were mixed and stirred under heat and reduced pressure at 110° C. for 2 hours, whereby the blended substances were dehydrated. Further, the thermally expandable hollow spheres (K), an adhesion imparting agent, and a curing catalyst were added to the mixture, and the whole was mixed and stirred under reduced pressure for 10 minutes. The resultant was hermetically loaded into a cartridge coated with aluminum, whereby a curing composition was prepared. It should be noted that the stirring machine used in this example was a universal mixing stirring machine manufactured by Shinagawa Machinery Works CO., LTD.

TABLE 7

| Component | Blended substances | Example No. | | | | | | | | | | | | |
|---|---|---|---|---|---|---|---|---|---|---|---|---|---|
| | | 18 | 19 | 20 | 21 | 22 | 23 | 24 | 25 | 26 | 27 | 28 | 29 | 30 |
| (I) | Acrylic polymer containing crosslinkable silyl group at terminal *41 | 65 | 35 | 65 | 65 | 65 | 65 | 65 | 65 | 65 | 65 | — | — | — |
| | Acrylic polymer containing crosslinkable silyl group *42 | — | — | — | — | — | — | — | — | — | — | 65 | — | — |
| | Acrylic-modified polyoxyalkylene based polymer containing crosslinkable silyl group *43 | — | — | — | — | — | — | — | — | — | — | — | 65 | — |
| | Polyoxyalkylene based polymer containing crosslinkable silyl group *44 | — | 30 | — | — | — | — | — | — | — | — | — | — | 65 |
| (J) | Acrylic polymer *45 | 35 | 35 | 35 | 35 | 35 | 35 | 35 | 35 | — | — | 35 | 35 | 35 |
| | Acrylic polymer *46 | — | — | — | — | — | — | — | — | 35 | — | — | — | — |
| | Polyoxyalkylene based polymer *47 | — | — | — | — | — | — | — | — | — | 35 | — | — | — |
| (K) | F-50D *48 | 3 | 3 | — | — | — | 1 | — | — | 1 | 1 | 3 | 1 | 1 |
| | F-30VSD *49 | — | — | 3 | — | — | — | 1 | — | — | — | — | — | — |
| | F-80VSD *50 | — | — | — | 3 | — | — | — | 1 | — | — | — | — | — |
| | F-30D *51 | — | — | — | — | 3 | — | — | — | — | — | — | — | — |
| | Calcium carbonate *52 | 90 | 90 | 90 | 90 | 90 | 90 | 90 | 90 | 90 | 90 | 90 | 90 | 90 |
| | Antioxidant *53 | 3 | 3 | 3 | 3 | 3 | 3 | 3 | 3 | 3 | 3 | 3 | 3 | 3 |
| | Dehydrating agent *54 | 3 | 3 | 3 | 3 | 3 | 3 | 3 | 3 | 3 | 3 | 3 | 3 | 3 |
| | Adhesion imparting agent *55 | 2 | 2 | 2 | 2 | 2 | 2 | 2 | 2 | 2 | 2 | 2 | 2 | 2 |
| | Curing catalyst *56 | 2 | 2 | 2 | 2 | 2 | 2 | 2 | 2 | 2 | 2 | 2 | 2 | 2 |

The amounts of the blended substances in Table 7 are each represented by "mass", and the symbols *41 to *56 represent the following products:
*41: SA 100S (manufactured by Kaneka Corporation, acrylic polymer having a crosslinkable silyl group at a terminal of any one of its molecules produced by living radical polymerization);
*42: the acrylic polymer containing a crosslinkable silyl group obtained in Synthesis Example 3 (silylation rate 1.1);
*43: MAX450 (manufactured by Kaneka Corporation, acrylic-modified polyoxyalkylene polymer containing a crosslinkable silyl group);
*44: MS Polymer S303 (manufactured by Kaneka Corporation, polyoxyalkylene polymer containing a crosslinkable silyl group);
*45: the acrylic polymer containing a crosslinkable silyl group obtained in Synthesis Example 4 (silylation rate 0.22);
*46: UP-1000 (manufactured by TOAGOSEI CO., LTD., acrylic organic polymer);
*47: DIOR3000 (manufactured by Mitsui Takeda Chemicals, INC., polyoxypropylene polymer);
*48: Matsumoto Microsphere F-50D (manufactured by Matsumoto Yushi-Seiyaku Co., Ltd, thermally expandable hollow spheres);
*49: Matsumoto Microsphere F-30VSD (manufactured by Matsumoto Yushi-Seiyaku Co., Ltd, thermally expandable hollow spheres);
*50: Matsumoto Microsphere F-80VSD (manufactured by Matsumoto Yushi-Seiyaku Co., Ltd, thermally expandable hollow spheres);
*51: Matsumoto Microsphere F-30D (manufactured by Matsumoto Yushi-Seiyaku Co., Ltd, thermally expandable hollow spheres);
*52: HAKUENKA CCR (manufactured by Shiraishi Kogyo Kaisha, Ltd., colloidal calcium carbonate);
*53: TINUVIN B75 (manufactured by Ciba Specialty Chemicals);
*54: A-171 (manufactured by Nippon Unicar Company Limited, vinyltrimethoxysilane);
*55: A-1120 (manufactured by Nippon Unicar Company Limited, N-β-(aminoethyl)-γ-aminopropyltrimethoxysilane); and
*56: No. 918 (manufactured by Sankyo Organic Chemicals Co., Ltd., product of a reaction between dibutyltin oxide and dioctyl phthalate).

Examples 19 to 30 and Comparative Examples 9 to 18

Curable compositions were each prepared in the same manner as in Example 18 except that the blended substances and a ratio at which each of the substances was blended were changed as shown in each of Tables 7 and 8.

TABLE 8

| Com-ponent | Blended substances | Comparative Example No. | | | | | | | | |
|---|---|---|---|---|---|---|---|---|---|---|
| | | 9 | 10 | 11 | 12 | 13 | 14 | 15 | 16 | 17 |
| (I) | Acrylic polymer containing crosslinkable silyl group at terminal *41 | — | — | — | 65 | 65 | 65 | 65 | 65 | 100 |
| | Acrylic polymer containing crosslinkable silyl group *42 | — | — | 65 | — | — | — | — | — | — |
| | Acrylic-modified polyoxyalkylene based polymer containing crosslinkable silyl group *43 | — | 65 | — | — | — | — | — | — | — |
| | Polyoxyalkylene based polymer containing crosslinkable silyl group *44 | 65 | — | — | — | — | — | — | — | — |
| (J) | Acrylic polymer *45 | 35 | 35 | 35 | 35 | 35 | 35 | 35 | 35 | — |
| (K) | F-50D *48 | — | — | — | — | — | — | — | 20 | 3 |
| Foaming agent | Ammonium polyphosphate *57 | — | — | — | — | 50 | — | — | — | — |
| | Metal hydrate *58 | — | — | — | — | — | 50 | — | — | — |
| | Expandable graphite *59 | — | — | — | — | — | — | 50 | — | — |
| | Calcium carbonate *52 | 90 | 90 | 90 | 90 | 90 | 90 | 90 | 90 | 50 |
| | Antioxidant *53 | 3 | 3 | 3 | 3 | 3 | 3 | 3 | 3 | 3 |
| | Dehydrating agent *54 | 3 | 3 | 3 | 3 | 3 | 3 | 3 | 3 | 3 |
| | Adhesion imparting agent *55 | 2 | 2 | 2 | 2 | 2 | 2 | 2 | 2 | 2 |
| | Curing catalyst *56 | 2 | 2 | 2 | 2 | 2 | 2 | 2 | 2 | 2 |

The amounts of the blended substances in Table 8 are each represented by "mass", the symbols *41 to 45, 48, and 52 to 56 each have the same meaning as that of Table 7, and the symbol *57 and *59 represents the following product:
*57: TERRAJU C60 (manufactured by CHISSO CORPORATION, coated ammonium polyphosphate);
*58: HIGILITE H42M (manufactured by Showa Denko K.K., aluminum hydroxide); and
*59: GRAF GUARD 220-50N (manufactured by TOMOE Engineering Co., Ltd.).

Each of the above resultant curable compositions was evaluated as described below. Tables 9 and 10 show the results.

(1) Fire Resistance

An abutting test body having a joint length of 50 mm, a joint width of 10 mm, and a joint depth of 6 mm is produced by using each of the resultant curable compositions and a ceramic siding material (MOEN M manufactured by NICHIHA CORPORATION). It should be noted that the body is aged under standard conditions of 23° C. and 50% RH for 14 days.

The test body is exposed to flame from a Bunsen gas burner, the flame having a height adjusted to 40 mm, in such a manner that the lower portion of the joint of the test body has a height of 20 mm from the uppermost portion of the Bunsen burner. The temperature of the back surface of the joint portion is measured 30 minutes and 60 minutes after the initiation of the exposure, and the test body is evaluated for its fire resistance on the basis of the following criteria:
⊚: lower than 140° C.;
○: 140° C. or higher and lower than 160° C.;
Δ: 160° C. or higher and lower than 200° C.; and
x: 200° C. or higher.

(2) State of the Rubber-Like Elastic Body on the Back Surface

The state of the rubber-like elastic body on the back surface of the joint portion 60 minutes after the above fire resistance test was evaluated by a finger touch and visual observation on the basis of the following criteria:
⊚: a considerable amount of the rubber-like elastic body remains;
○: a small amount of the rubber-like elastic body remains;
Δ: no rubber-like elastic body remains, and the back surface becomes a hard film; and
x: the joint itself falls within 60 minutes, and does not remain.

(3) Hardness

A test body is produced in the same manner as in the above fire resistance test, and the hardness of the cured curable composition is measured with a rubber hardness meter (JIS A type).

(4) Physical Property Retentivity

An abutting test body was produced in the same manner as in the above fire resistance test by using each of: a composition before the addition of the component (K) or a foaming agent of each of the resultant curable compositions [Composition Before Addition]; and each of the resultant curable compositions [composition after the addition of the component (K) or a foaming agent, Composition After Addition]. It should be noted that each body was aged under standard conditions of 23° C. and 50% RH for 14 days. Each of the test bodies was subjected to a tensile strength test at a tension speed of 50 mm/min, and its maximum elongation rate was measured. The maximum elongation rates of Composition Before Addition and Composition After Addition were compared, and a physical property retentivity (%) was determined. Each of the compositions was evaluated for its physical property retentivity on the basis of the following criteria:
○: the physical property retentivity is 50% or more; and
x: the physical property retentivity is less than 50%.

(5) Color Tone

Each of the resultant curable compositions was mixed and kneaded with a pigment so as to be provided with a color tone. Each of the compositions was evaluated for its color tone on the basis of the following criteria:
○: a composition can be provided with an arbitrary color tone; and
x: a composition cannot be provided with an arbitrary color tone.

(6) Elongation Rate Test

Each of the resultant curable compositions was subjected to an elongation rate test in the same manner as in Example 1, and its maximum elongation rate was measured.

TABLE 9

| | | Example No. | | | | | | | | | | | | |
|---|---|---|---|---|---|---|---|---|---|---|---|---|---|---|
| | | 18 | 19 | 20 | 21 | 22 | 23 | 24 | 25 | 26 | 27 | 28 | 29 | 30 |
| Fire resistance | After 30 minutes | ⊚ | ⊚ | ⊚ | ⊚ | ⊚ | ○ | ○ | ○ | ○ | ○ | ⊚ | Δ | Δ |
| | After 60 minutes | ⊚ | ○ | ⊚ | ⊚ | ⊚ | ○ | ○ | ○ | ○ | ○ | ⊚ | Δ | X |

TABLE 9-continued

| | Example No. | | | | | | | | | | | | |
|---|---|---|---|---|---|---|---|---|---|---|---|---|---|
| | 18 | 19 | 20 | 21 | 22 | 23 | 24 | 25 | 26 | 27 | 28 | 29 | 30 |
| State of rubber-like elastic body on back surface of joint | ⊚ | ⊚ | ⊚ | ⊚ | ⊚ | ○ | ○ | ○ | ○ | Δ | ⊚ | Δ | X |
| Hardness | 12 | 11 | 12 | 12 | 12 | 12 | 12 | 12 | 12 | 12 | 15 | 25 | 10 |
| Physical property retentivity | ○ | ○ | ○ | ○ | ○ | ○ | ○ | ○ | ○ | ○ | ○ | ○ | ○ |
| Color tone | ○ | ○ | ○ | ○ | ○ | ○ | ○ | ○ | ○ | ○ | ○ | ○ | ○ |
| Elongation rate [%] | 410 | 410 | 410 | 410 | 410 | 430 | 430 | 430 | 360 | 360 | 160 | 250 | 300 |

TABLE 10

| | | Comparative Example No. | | | | | | | | |
|---|---|---|---|---|---|---|---|---|---|---|
| | | 9 | 10 | 11 | 12 | 13 | 14 | 15 | 16 | 17 |
| Fire resistance | After 30 minutes | x | Δ | Δ | Δ | ○ | Δ | ○ | x | x |
| | After 60 minutes | x | x | Δ | Δ | ○ | Δ | ○ | x | x |
| State of rubber-like elastic body on back surface of joint | | x | x | Δ | Δ | ○ | Δ | Δ | x | x |
| Hardness | | 10 | 25 | 15 | 12 | 25 | 25 | 25 | 16 | 50 |
| Physical property retentivity | | — | — | — | — | x | x | x | x | ○ |
| Color tone | | ○ | ○ | ○ | ○ | ○ | ○ | x | ○ | ○ |
| Elongation rate [%] | | 310 | 260 | 170 | 440 | 180 | 200 | 150 | 200 | 200 |

As shown in Tables 9 and 10, each of the curable compositions of Examples 18 to 30 had fire resistance, and showed a good physical property retentivity and a good color tone. Each of the curable compositions of Examples 18 to 26 and 28 each using an acrylic polymer as each of the components (I) and (J) showed particularly excellent fire resistance, and the state of a rubber-like elastic body made of each of the curable compositions on the back surface of a joint was extremely good. Further, each of the curable compositions of Examples 18 to 27 each using a (meth)acrylic polymer having a crosslinkable silyl group at a terminal of any one of its molecules as the component (I) not only had fire resistance but also showed a high elongation rate particularly useful in a sealing material. On the other hand, each of the curable composition of Comparative Example 9 not blended with the component (K) and the curable composition of Comparative Example 16 blended with a large amount of the component (K) could not obtain fire resistance, and showed a poor physical property retentivity. The curable composition of Comparative Example 17 not blended with the component (J) could not obtain fire resistance. In addition, each of the curable compositions of Comparative Examples 2 to 7 was also poor in physical property retentivity.

Comparative Example 18

A composition was prepared in the same manner as in Example 23 except that the component (I) was not blended. However, the resultant composition did not cure.

The invention claimed is:

1. A curable composition having fire resistance, comprising:
   (I) a reactive organic polymer comprising molecules with an average of at least one crosslinkable silyl group;
   (J) a reactive organic polymer comprising molecules with an average of less than one crosslinkable silyl group; and
   (K) thermally expandable hollow spheres,
   wherein the curable composition contains 0.01 parts by weight or more to less than 20 parts by weight of the component (K), with respect to a total of 100 parts by weight of the components (I) and (J).

2. The curable composition according to claim 1, wherein the component (I) comprises a (meth)acrylic polymer.

3. The curable composition according to claim 1, wherein the component (I) comprises a (meth)acrylic polymer having a crosslinkable silyl group at a terminal of its molecular chain.

4. The curable composition according to claim 3, wherein the component (I) comprises a (meth)acrylic polymer produced by a living radical polymerization method.

5. The curable composition according to claim 3, wherein the component (I) comprises a (meth)acrylic polymer produced by an atom transfer radical polymerization method.

6. The curable composition according to claim 1, wherein the component (I) comprises a mixture of a (meth)acrylic polymer having a crosslinkable silyl group at a terminal of its molecular chain and a polyoxyalkylene based polymer containing a crosslinkable silyl group.

7. The curable composition according to claim 1, wherein the component (J) comprises a (meth)acrylic polymer.

8. The curable composition according to claim 1, wherein the component (J) has a weight average molecular weight of 2,000 to 50,000.

9. The curable composition according to claim 1, wherein the curable composition contains the component (J) in an amount of 10 to 300 parts by weight with respect to 100 parts by weight of the component (I).

10. The curable composition according to claim 1, wherein the curable composition has a hardness of 40 or less obtained with a rubber hardness meter after curing.

11. A sealing material, comprising the curable composition according to claim 1, wherein the sealing material is fire resistant.

* * * * *